US007084983B2

(12) United States Patent
Hill

(10) Patent No.: US 7,084,983 B2
(45) Date of Patent: Aug. 1, 2006

(54) INTERFEROMETRIC CONFOCAL MICROSCOPY INCORPORATING A PINHOLE ARRAY BEAM-SPLITTER

(75) Inventor: Henry Allen Hill, Tucson, AZ (US)

(73) Assignee: Zetetic Institute, Tucson, AZ (US)

( * ) Notice: Subject to any disclaimer, the term of this patent is extended or adjusted under 35 U.S.C. 154(b) by 221 days.

(21) Appl. No.: 10/765,229

(22) Filed: Jan. 27, 2004

(65) Prior Publication Data
US 2004/0246486 A1 Dec. 9, 2004

Related U.S. Application Data

(60) Provisional application No. 60/442,858, filed on Jan. 27, 2003, provisional application No. 60/442,982, filed on Jan. 28, 2003.

(51) Int. Cl.
*G01B 9/02* (2006.01)
(52) U.S. Cl. .................. 356/450; 356/511; 356/521
(58) Field of Classification Search ............. 356/450, 356/511, 521
See application file for complete search history.

(56) References Cited

U.S. PATENT DOCUMENTS

| 3,628,027 | A | 12/1971 | Brauss |
| 3,748,015 | A | 7/1973 | Offner |
| 4,011,011 | A | 3/1977 | Hemstreet et al. |
| 4,226,501 | A | 10/1980 | Shafer |
| 4,272,684 | A | 6/1981 | Seachman |
| 4,685,803 | A | 8/1987 | Sommargren |
| 4,733,967 | A | 3/1988 | Sommargren |
| 5,220,403 | A | 6/1993 | Batchelder et al. ......... 356/345 |
| 5,241,423 | A | 8/1993 | Chiu et al. |
| 5,327,223 | A | 7/1994 | Korth |
| 5,485,317 | A | 1/1996 | Perissinotto |

(Continued)

OTHER PUBLICATIONS

U.S. Appl. No. 09/852,369, filed Jan. 3, 2002, Hill.

(Continued)

*Primary Examiner*—Gregory Toetley, Jr.
*Assistant Examiner*—Patrick Connolly
(74) *Attorney, Agent, or Firm*—Wilmer Cutler Pickering Hale and Dorr LLP

(57) ABSTRACT

A confocal interferometry system for making interferometric measurements of an object, the system including an array of pinholes positioned to receive a source beam and, for each pinhole in the array of pinholes, separate the source beam into a corresponding reference beam on one side of the array of pinholes and a corresponding measurement beam on the other side of the array of pinholes; a first imaging system arranged to image the array of pinholes onto an array of spots on or in the object so that the corresponding measurement beam for each pinhole of the array of pinholes is directed to a different corresponding spot of the array of spots and produces for that spot a corresponding return measurement beam, the first imaging system also arranged to image the array of spots onto the array of pinholes so that the corresponding return measurement beam from each spot of the array of spots is directed back to a corresponding different pinhole in the array of pinholes, wherein for each pinhole the pinhole array combines the return measurement and reference beams for that pinhole to produce a corresponding combined beam; and a detector assembly including an array of detector elements aligned with the array of pinholes so that the corresponding combined beam for each pinhole is directed to different corresponding detector element of the array of detector elements.

30 Claims, 6 Drawing Sheets

U.S. PATENT DOCUMENTS

| | | | |
|---|---|---|---|
| 5,602,643 A | 2/1997 | Barrett | |
| 5,614,763 A | 3/1997 | Womack | |
| 5,633,972 A | 5/1997 | Walt | |
| 5,659,420 A | 8/1997 | Wakai | |
| 5,699,201 A | 12/1997 | Lee | |
| 5,760,901 A * | 6/1998 | Hill | 356/450 |
| 5,828,455 A | 10/1998 | Smith | |
| 5,894,195 A | 4/1999 | McDermott | |
| 5,915,048 A | 6/1999 | Hill et al. | |
| 6,052,231 A | 4/2000 | Rosenbluth | |
| 6,091,496 A * | 7/2000 | Hill | 356/491 |
| 6,124,931 A | 9/2000 | Hill | |
| 6,271,923 B1 | 8/2001 | Hill | |
| 6,330,065 B1 | 12/2001 | Hill | |
| 6,445,453 B1 * | 9/2002 | Hill | 356/450 |
| 6,447,122 B1 | 9/2002 | Kobayashi et al. | |
| 6,480,285 B1 * | 11/2002 | Hill | 356/492 |
| 6,552,805 B1 * | 4/2003 | Hill | 356/511 |
| 6,552,852 B1 | 4/2003 | Hill | |
| 6,597,721 B1 | 7/2003 | Hutchinson et al. | |
| 6,606,159 B1 * | 8/2003 | Hill | 356/491 |
| 6,667,809 B1 * | 12/2003 | Hill | 356/511 |
| 6,714,349 B1 | 3/2004 | Nam | |
| 6,717,736 B1 * | 4/2004 | Hill | 359/629 |
| 6,753,968 B1 * | 6/2004 | Hill | 356/491 |
| 6,775,009 B1 * | 8/2004 | Hill | 356/516 |
| 6,847,029 B1 * | 1/2005 | Hill | 250/216 |
| 6,847,452 B1 | 1/2005 | Hill | |
| 2002/0021451 A1 * | 2/2002 | Hill | 356/511 |
| 2002/0033952 A1 * | 3/2002 | Hill | 356/512 |
| 2002/0033953 A1 * | 3/2002 | Hill | 356/516 |
| 2002/0074493 A1 | 6/2002 | Hill | |
| 2002/0148955 A1 * | 10/2002 | Hill | 250/234 |
| 2003/0147083 A1 * | 8/2003 | Hill | 356/491 |
| 2003/0174992 A1 | 9/2003 | Levene | |
| 2004/0201852 A1 * | 10/2004 | Hill | 356/511 |
| 2004/0201853 A1 * | 10/2004 | Hill | 356/511 |
| 2004/0201854 A1 * | 10/2004 | Hill | 356/511 |
| 2004/0201855 A1 * | 10/2004 | Hill | 356/511 |
| 2004/0202426 A1 | 10/2004 | Hill | |
| 2004/0227950 A1 * | 11/2004 | Hill | 356/450 |
| 2004/0227951 A1 * | 11/2004 | Hill | 356/450 |
| 2004/0228008 A1 * | 11/2004 | Hill | 359/727 |
| 2004/0246486 A1 * | 12/2004 | Hill | 356/450 |
| 2004/0257577 A1 * | 12/2004 | Hill | 356/450 |
| 2005/0036149 A1 * | 2/2005 | Hill | 356/450 |
| 2005/0111006 A1 * | 5/2005 | Hill | 356/511 |
| 2005/0111007 A1 * | 5/2005 | Hill et al. | 356/511 |
| 2005/0128487 A1 * | 6/2005 | Hill | 356/496 |
| 2005/0206909 A1 * | 9/2005 | Hill | 356/512 |
| 2005/0254063 A1 * | 11/2005 | Hill | 356/512 |
| 2005/0275848 A1 * | 12/2005 | Hill | 356/512 |

OTHER PUBLICATIONS

U.S. Appl. No. 09/917,402, filed Jul. 27, 2001, Hill.
U.S. Appl. No. 10/765,368, filed Jan. 27, 2004, Hill.
U.S. Appl. No. 60/442,858, filed Jul. 27, 2002, Hill.
U.S. Appl. No. 60/442,982, filed Jan. 29, 2003, Hill.
U.S. Appl. No. 60/444,707, filed Jan. 4, 2003, Hill.
U.S. Appl. No. 60/445,739, filed Feb. 7, 2003, Hill.
U.S. Appl. No. 60/447,254, filed Feb. 13, 2003, Hill.
U.S. Appl. No. 60/459,425, filed Apr. 11, 2003, Hill.
U.S. Appl. No. 60/460,129, filed Apr. 3, 2003, Hill.
Silfvast, W. (1995) "Lasers", *Handbook of Optics,* New York:: McGraw-Hill, Ch. 11.
Stoicheff, et al. "Tunable, Coherent Sources for High Resolution VUV and XUV Spectroscopy", *Laser Techniques for Extreme Ultraviolet Spectroscopy,* p. 19 (1982).
Harris, et al. "Generation of Ultraviolet and Vacuum Ultraviolet Radiation" *Laser Spectroscopy*.
Kung, A.H., "Generation of Tunable Picosecond VUV Radiation" *Appl. Phys Lett.* 25, p. 653 (1974).
D'ariano, et al. "Lower Bounds on Phase Sensitivity in Ideal and Feasible Measurements" *Phys. Rev. A* 49, pp. 3022-3036 (1994).

* cited by examiner

INTERFEROMETRIC CONFOCAL MICROSCOPY INCORPORATING A PINHOLE ARRAY BEAM-SPLITTER

This application claims the benefit of U.S. Provisional Application No. 60/442,858, filed Jan. 27, 2003 (ZI-47); and U.S. Provisional Application No. 60/442,892, filed Jan. 28, 2003 (ZI-45), both of which are incorporated herein by reference.

This application also incorporates by reference the following applications: U.S. patent application, entitled "Apparatus And Method For Joint Measurements Of Conjugated Quadratures Of Fields Of Reflected/Scattered And Transmitted Beams By An Object In Interferometry," filed on Jan. 27, 2004 (ZI-47).

TECHNICAL FIELD

This invention relates to interferometric confocal microscopy.

BACKGROUND OF THE INVENTION

In the field of interferometric microscopy, it is known to use a beam-splitter based, for example, on thin film technology to generate reference and measurement beams from an input beam and then to subsequently combine the measurement beam and the reference beam to form an output beam. The output beam is detected to generate an array of electrical interference signals.

SUMMARY OF THE INVENTION

In general, in one aspect, the invention involves using a pinhole array as a beam-splitter to generate and combine reference and measurement beams in interferometric confocal microscopy systems. The pinhole array beam-splitter further functions as the traditional conjugate confocal pinhole arrays.

An input beam is incident on a pinhole array wherein a first portion thereof is transmitted as an array of reference beams that comprise a component of an output beam and a second portion thereof is scattered as an array of measurement beams. A third portion of the input beam is reflected that substantially retains the wavefront properties of the input beam. The pinhole array comprises apertures that have characteristic dimensions of the order of the wavelength of the input beam and as a consequence, the second portion has a large root-mean-square value for the scattering angle. The input beam and the third portion of the input beam have a relatively small root-mean-square value for the corresponding beam divergences. The difference in divergence of the second portion and the third portion is used to eliminate the third portion from the array of beams detected downstream.

At this point, the pinhole array has served as a beam-splitter to generate an array of reference beams and a corresponding array of measurement beams from an input beam. The pinhole array has also served the function of the first traditional pinhole array of a confocal microscopy imaging system. The array of measurement beams is next incident on a substrate as an array of in-focus spots in or on the substrate that are conjugate to the pinholes of the pinhole array beam-splitter and portions thereof are reflected and/or scattered to generate a corresponding array of return measurement beams. The array of return measurement beams is next directed to the pinhole array beam-splitter as an array of in focus spots that are conjugate to the in-focus spots in or on the substrate and portions thereof are transmitted as a return measurement beam component of the output beam. The output beam thus comprises an array of reference beams and an overlapping array of return measurement beams having approximately the same divergence properties. The array of overlapped beams of the output beam is detected by an array of detectors or detector elements to generate an array of electrical interference signals.

In the return pass to the pinhole array by the measurement beam or the pass of the return measurement beam to the pinhole array, the pinhole array serves as a beam-splitter a second time and also serves the function of the second traditional pinhole array of a confocal microscopy imaging system. Conjugated quadratures of fields of the return measurement beam are determined using a homodyne detection method. The homodyne detection method may comprise a single-, double-, bi-, or a quad-homodyne detection method. Joint measurements of conjugated quadratures of fields of the return measurement beam are obtained when using the bi-and quad-homodyne detection methods for either a "single" or "multiple" wavelength operation wherein single or multiple wavelength refers to the magnitude of the frequency differences of the corresponding frequency components of the input beam. A joint measurement corresponds to measurement beams being coextensive in space and time, to corresponding reference beams being coextensive in space and time, and that each electrical interference signal value comprises contributions from each of the two components of the conjugated quadratures of fields measured. Joint measurements of conjugated quadratures of fields of the return measurement beam may also be obtained for the return measurement beam wherein there is an additional beam incident on the substrate with a predetermined difference in time between the time of incidence of the additional beam and of the measurement beam.

In general, in one aspect, the invention features a confocal interferometry system for making interferometric measurements of an object. The system includes an array of pinholes positioned to receive a source beam and, for each pinhole in the array of pinholes, separate the source beam into a corresponding reference beam on one side of the array of pinholes and a corresponding measurement beam on the other side of the array of pinholes; a first imaging system arranged to image the array of pinholes onto an array of spots on or in the object so that the corresponding measurement beam for each pinhole of the array of pinholes is directed to a different corresponding spot of the array of spots and produces for that spot a corresponding return measurement beam, wherein the first imaging system is also arranged to image the array of spots onto the array of pinholes so that the corresponding return measurement beam from each spot of the array of spots is directed back to a corresponding different pinhole in the array of pinholes, wherein for each pinhole the pinhole array combines the return measurement and reference beams for that pinhole to produce a corresponding combined beam and the system further includes a detector assembly including an array of detector elements aligned with the array of pinholes so that the corresponding combined beam for each pinhole is directed to different corresponding detector element of the array of detector elements.

Other embodiments include one or more of the following features. The confocal interferometry system also includes a second imaging system that images the array of pinholes onto the array of detector elements. The first imaging system includes a beam splitter positioned to receive, for each pinhole, the corresponding measurement beam and separate that corresponding measurement beam into a transmitted portion and a reflected portion; and a reflecting surface positioned to image each pinhole of the pinhole array onto a corresponding spot on or in the object via the beam splitter and thereby direct the measurement beam from that pinhole onto the corresponding spot. The reflecting surface is substantially concentric with a point on the object. The first imaging system also includes a refracting surface positioned between the object and the beam splitter to receive light rays from the object. The reflecting surface substantially conforms to a sphere having a first radius and the refracting surface conforms to a sphere having a second radius, wherein the first radius is greater than the second radius. In addition, the reflecting surface and the refracting surface have the same center of curvature.

In other embodiments, the first imaging system includes a refracting surface positioned between the beam splitter and the pinhole array to receive light rays focused by the reflecting surface and the reflecting surface is substantially concentric with an image point on the pinhole array.

In still other embodiments, the first imaging system also includes a second reflecting surface on the other side of the beam splitter from the first-mentioned reflecting surface and positioned to image each pinhole of the pinhole array onto its corresponding spot on or in the object via the beam splitter. In these cases, the first-mentioned reflecting surface is substantially concentric with a point on the object and the second reflecting surface is substantially concentric with the image point on the pinhole array. Also, the first imaging system includes a first refracting surface positioned between the object and the beam splitter to receive light rays from the object and a second refracting surface positioned between the beam splitter and the pinhole array to receive light rays focused by the reflecting surface. The first-mentioned reflecting surface substantially conforms to a sphere having a first radius and the first refracting surface conforms to a sphere having a second radius, wherein the first radius is greater than the second radius and wherein the first-mentioned reflecting surface and the first refracting surface have the same center of curvature. Similarly, the second reflecting surface substantially conforms to a sphere having a first radius and the second refracting surface conforms to a sphere having a second radius, wherein the first radius is greater than the second radius and wherein the second reflecting surface and the second refracting surface have the same center of curvature. Also, the first-mentioned reflecting surface and the second reflecting surface have respective centers of curvature that are conjugate points with respect to the beam splitter.

In various embodiments, the pinhole array is a two-dimensional array made up of equally-spaced circular holes.

In general, in another aspect, the invention features a confocal interferometry system for making interferometric measurements of an object. The system includes an array of pinholes positioned to receive a source beam and, for any selected pinhole in the array of pinholes, separate the source beam into a corresponding reference beam on one side of the array of pinholes and a corresponding measurement beam on the other side of the array of pinholes; and a first imaging system arranged to image the array of pinholes onto an array of spots on or in the object so that the corresponding measurement beam for the any selected pinhole is directed to a corresponding spot of the array of spots and produces for that spot a corresponding return measurement beam and the first imaging system is also arranged to image the array of spots onto the array of pinholes so that the corresponding return measurement beam from said given spot is directed back to the any selected pinhole, wherein the pinhole array combines the corresponding reference and return measurement beams to produce a corresponding combined beam; and a detector assembly including an array of detector elements aligned with the array of pinholes so that the corresponding combined beam for each pinhole is directed to different corresponding detector element of the array of detector elements.

In general, in yet another aspect, the invention features a confocal interferometry system for making interferometric measurements of an object in which the system includes: a mask defining a pinhole positioned to receive a source beam and separate the source beam into a reference beam on one side of the pinhole and a measurement beam on the other side of the pinhole; a first imaging system arranged to image the pinhole onto a spot on or in the object so that the measurement beam is directed to that spot and produces for that spot a return measurement beam, the first imaging system also arranged to image that spot onto the pinhole so that the return measurement beam from that spot is directed back to the pinhole, wherein the pinhole combines the return measurement and reference beams to produce a combined beam; and a detector system including a detector element that receives the combined beam.

An advantage of at least one embodiment of the present invention is that a single array of pinholes serves multiple functions as a beam-splitter and as the set of traditional conjugate confocal pinhole arrays of a confocal microscopy system.

Another advantage of at least one embodiment of the present invention is that as a result of there being only a single array of pinholes that serve both the functions of a beam-splitter and of the traditional conjugate confocal pinhole arrays of a confocal microscopy system, the traditional critical alignment requirement of conjugate confocal pinholes in a confocal microscopy system does not arise, i.e. the registration of the pinholes at a detector with the image of the array of images in or on a substrate generated as images of an array of pinholes generating the array of measurement beams is automatic.

Another advantage of at least one embodiment of the present invention is that the pinhole array beam-splitter may be nominally achromatic with respect to certain properties of the transmitted and scattered beams.

Another advantage of at least one embodiment of the present invention is that either a single- or a double-homodyne detection method can be used to obtain conjugated quadratures of fields of beams reflected and/or scattered by a substrate being imaged.

Another advantage of at least one embodiment of the present invention is that a bi-homodyne detection method can be used to obtain joint measurements of conjugated quadratures of fields of beams reflected and/or scattered by a substrate being imaged.

Another advantage of at least one embodiment of the present invention is that a quad-homodyne detection method can be used to obtain joint measurements of conjugated quadratures of fields of beams reflected/scattered by a substrate being imaged.

Another advantage of at least one embodiment of the present invention is that relative phase shifts between the arrays of reference and measurement beams can be introduced by changing the frequencies of components of the input beam.

Another advantage of at least one embodiment of the present invention is that imaging of a substrate with a lateral resolution of the order of 100 nm and a longitudinal resolution of the order of 200 nm may be obtained with a working distance of the order of one or more mm.

Another advantage of at least one embodiment of the present invention is that imaging of an interior portion of a substrate with a lateral resolution of the order of 100 nm and a longitudinal resolution of the order of 200 nm may be obtained with a working distance of the order of one or more mm and for depths within the substrate of the order of at least 3 microns.

Another advantage of at least one embodiment of the present invention is that the single pinhole array beam-splitter can be translated relative to other components of an interferometer system to operate as part of a scanning system wherein the translation of the pinhole array beam-splitter causes a translation or scanning of the array of image spots on or in the substrate that are conjugate to the pinholes with the corresponding function as confocal pinholes and the function as the beam-splitter pinholes remaining simultaneously operational without any additional alignment of components required.

Another advantage of at least one embodiment of the present invention is that a joint measurement of conjugated quadratures of fields of beams reflected and/or scattered by a substrate may be obtained with two pulses or pulse sequences of an input beam.

Another advantage of at least one embodiment of the present invention is that the phases of the input beam components do not affect measured conjugated quadratures of fields.

DETAILED DESCRIPTION

As will be described in more detail below, a single pinhole array is used to serve the functions of the traditional confocal pinhole arrays and the function of a beam-splitter to generate and combine reference and measurement beams in interferometric confocal microscopy systems. Single-homodyne and double-detection methods are used to obtain measurements of conjugated quadratures of fields of beams reflected/scattered by a portion of substrate being imaged and bi-homodyne and quad-homodyne detection methods are used to obtain joint measurements of conjugated quadratures of fields of beams reflected and/or scattered by a portion of a substrate being imaged. The single-, double-, bi-, and quad-homodyne detection methods are implemented using an input beam to an interferometric confocal microscopy system comprising a single-frequency component, two frequency components, and four frequency components. The difference in frequencies of certain of the frequency components of the double-, bi-, and quad-homodyne detection methods may be large such as a fraction of the frequencies of the respective beams or of the order of the frequencies of the respective beams. A time delay may be introduced between the temporal profiles of pulses corresponding to additional frequency components and the frequency components used in the single-, double-, bi-, and quad-homodyne detection methods and conjugated quadratures are obtained in the case of the single- and double-homodyne detection methods and jointly measured conjugated quadratures are obtained in the case of the bi- and quad-homodyne detection methods of fields reflected and/or scattered beams by a substrate being imaged.

Figure 1A:
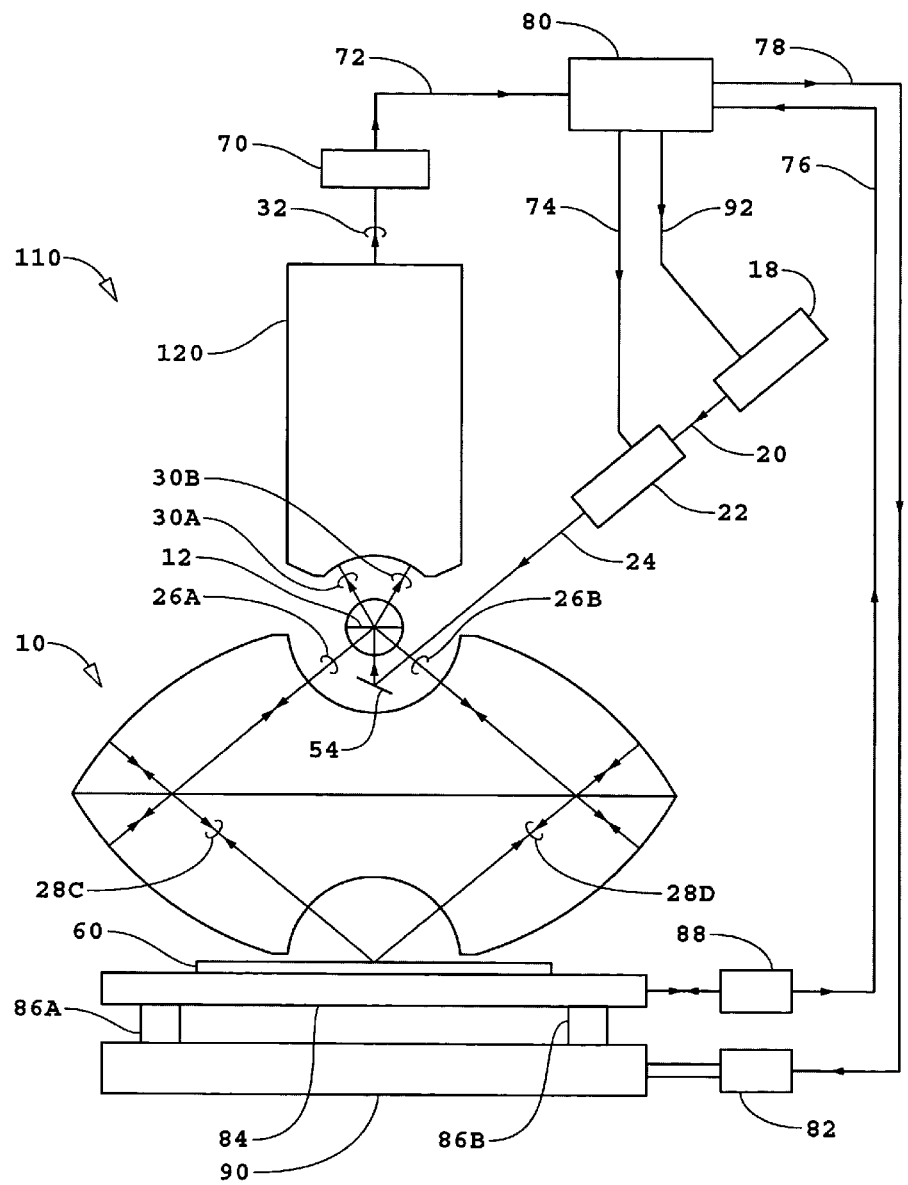
FIG. 1a is a schematic diagram of a confocal microscope system

An interferometer system is shown schematically in FIG. 1a that is used and variants thereof used in embodiments of the present invention. The interferometer system includes a first imaging system generally indicated as 10, pinhole array beam-splitter 12, detector 70, and a second imaging system generally indicated as 110. Second imaging system 110 is a low power microscope objective having a large working distance, e.g., Nikon ELWD and SLWD objectives and Olympus LWD, ULWD, and ELWD objectives.

Figure 1B:
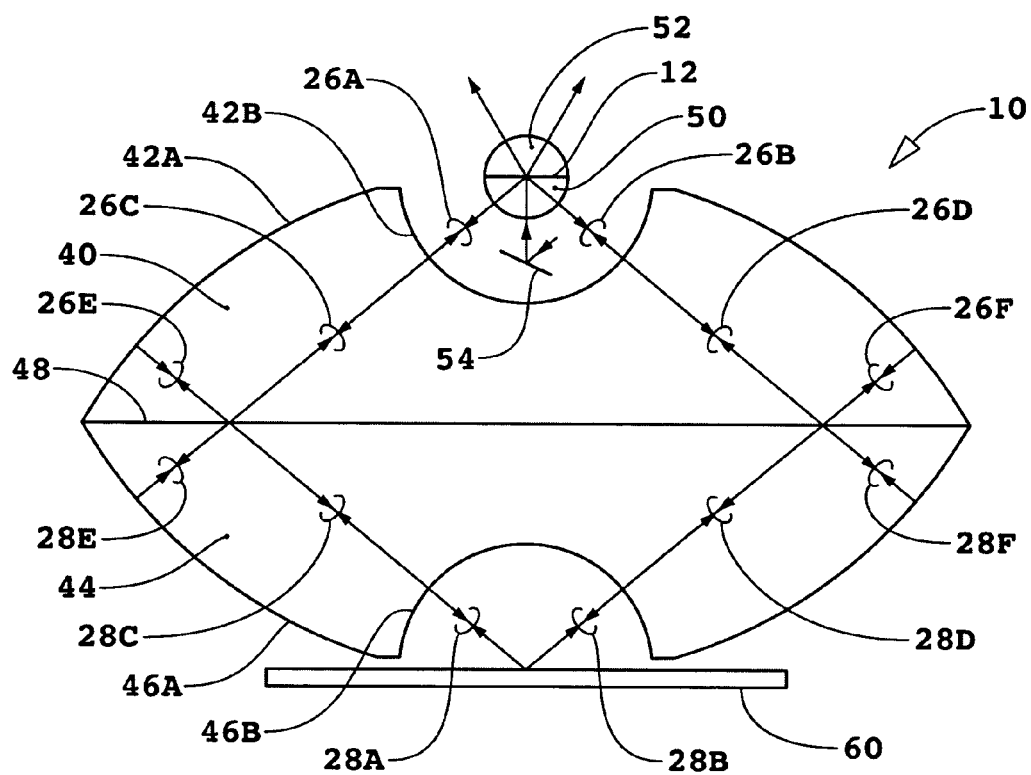
FIG. 1b is a schematic diagram of catadioptric imaging system.

First imaging system 10 is shown schematically in FIG. 1b. Imaging system 10 is a catadioptric system such as described in commonly owned U.S. Pat. No. 6,552,852 B1 (ZI-38) entitled "Catoptric and Catadioptric Imaging System" and U.S. Provisional patent application Ser. No. 10/366,651 (ZI-43), filed Feb. 3, 2003 and also entitled "Catoptric and Catadioptric Imaging System," wherein both are by Henry A. Hill. The contents of the cited U.S. patent and U.S. Provisional Patent Applications are incorporated herein in their entirety by reference.

Catadioptric imaging system 10 comprises catadioptric elements 40 and 44, beam-splitter 48, and convex lens 50. Surfaces 42A and 46A are convex spherical surfaces with nominally the same radii of curvature and the respective centers of curvature of surfaces 42A and 46A are conjugate points with respect to beam-splitter 48. Surfaces 42B and 46B are concave spherical surfaces with nominally the same radii of curvature. The centers of curvature of surfaces 42B and 46B are the same as the centers of curvature of surfaces 46A and 42A, respectively. The center of curvature of convex lens 50 is the same as the center of curvature of surfaces 42B and 46A. The radius of curvature of surface 46B is selected so as to minimize the loss in efficiency of the imaging system 10 and to produce a working distance for imaging system 10 acceptable for an end use application. The radius of curvature of convex lens 50 is selected so that the off-axis aberrations of the catadioptric imaging system 10 are compensated. The medium of elements 40 and 44 may be for example fused silica or commercially available glass such as SF11. The medium of convex lens 50 may be for example fused silica, YAG, or commercially available glass such as SF11. An important consideration in the selection of the medium of elements 40 and 44 and convex lens 50 will the transmission properties for the frequencies of beam 24.

Figure 1C:
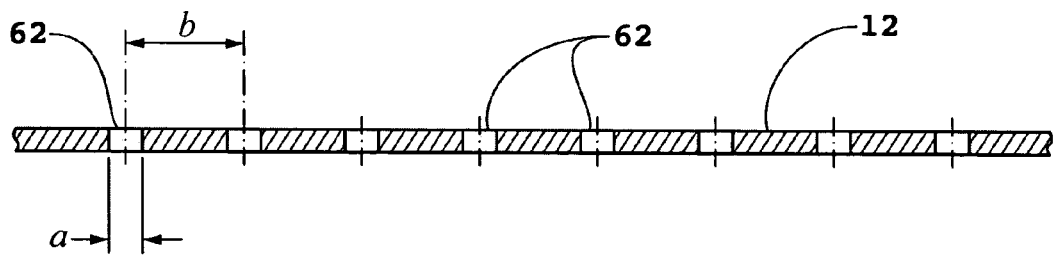
FIG. 1c is a schematic diagram of a pinhole array used in a confocal microscope system.

Convex lens 52 has a center of curvature the same as the center of curvature of convex lens 50. Convex lenses 50 and 52 are bonded together with pinhole beam-splitter 12 in between. Pinhole array beam-splitter 12 is shown in FIG. 1c. The pattern of pinholes in pinhole array beam-splitter is chosen to match the requirements of an end use application. An example of a pattern is a two dimensional array of equally spaced pinholes in two orthogonal directions. The pinholes may comprise circular apertures, rectangular apertures, or combinations thereof such as described in commonly owned U.S. patent application Ser. No. 09/917,402 (ZI-15), filed Jul. 27, 2001, entitled "Multiple-Source Arrays for Confocal and Near-field Microscopy" by Henry A. Hill and Kyle Ferrio of which the contents are incorporated herein in their entirety by reference. A non-limiting example of a pinhole array for pinhole array beam-splitter 12 is shown in FIG. 1c having a spacing between pinholes of b with aperture size a.

Input beam 24 is reflected by mirror 54 to pinhole beam-splitter 12 where a first portion thereof is transmitted as reference beam components of output beam components 30A and 30B and a second portion thereof scattered as measurement beam components of beam components 26A and 26B. Measurement beam components of beam components 26A and 26B are imaged as measurement beam components of beam components 28A and 28B to an array of image spots in an image plane either above, on, or in substrate 60. A portion of measurement beam components 28A and 28B incident on substrate 60 are reflected and/or scattered as return measurement beam components of beam components 28A and 28B. Return measurement beam components of beam components 28A and 28B are imaged by catadioptric imaging system 10 to spots that are coincident with the pinholes of pinhole beam-splitter 12 and a portion thereof is transmitted as return measurement beam components of output beam components 30A and 30B.

The imaging properties of catadioptric imaging system 10 are described for the return measurement beam components of beam components 28A and 28B shown in FIG. 1b. The description of the imaging properties of catadioptric imaging system 10 for the measurement beam components of beam components 26A and 26B will be the same as the corresponding portion of the description given for the return measurement beam components of beam components 28A and 28B. Return measurement beam components of beam components 28A and 28B are transmitted by refractive surface 46B as return measurement beam components of beam components 28C and 28D, respectively. Return measurement beam component of beam component 28C is incident on beam-splitter 48 and first and second portions thereof are transmitted and reflected, respectively, as respective return measurement beam components of beam components 26E and 28E, respectively. The respective portions of the return measurement beam components of beam components 26E and 28E are subsequently reflected by reflective surfaces 42A and 46A, respectively, as portions of components of return measurement beam components of beam components 26E and 28E, respectively, directed toward beam-splitter 48. First and second portions of return measurement beam components of beam components 26E and 28E directed toward beam-splitter 48 are reflected and transmitted, respectively, as first portions of return measurement beam components of beam components 26C and 28C, respectively. First and second portions of components of return measurement beam components of beam component 28E directed toward beam-splitter 48 are transmitted and reflected, respectively, as second portions of return measurement beam components of beam components 26C and 28C, respectively. The description of the corresponding propagation of return measurement beam component of beam component 28D is the same as the corresponding portion of the description given for the propagation of the return measurement beam component of beam component 28C.

The amplitude A of return measurement beam component of beam component 26C comprising the first portions of the return measurement beam components of beam components 26E and 28E transmitted by beam-splitter 48 relative to the amplitude of the corresponding portion of return measurement beam component of beam component 28C propagating toward beam splitter 48 is given by the equation $$A = T(\Theta)^{1/2} R(\Theta)^{1/2} (1 + \cos \phi) \tag{1}$$

where $\Theta$ is an angle of incidence at beam-splitter 48 of the first portions of return measurement beam components of beam components 26E and 28E transmitted by beam-splitter 48, and $T(\Theta)^{1/2}$ and $R(\phi)^{1/2}$ are the complex transmission and reflection amplitude coefficients, respectively, and $\phi$ is the relative phase shift between the first portions of return measurement beam components of beam components 26E and 28E transmitted by beam-splitter 48. A maximum value for the amplitude A is obtained when the relative radial positions of reflective surfaces 42A and 46A are set to values to achieve the condition $$\phi = 0, 2\pi, 4\pi, \tag{2}$$

Catadioptric imaging system 10 is functionally equivalent to the imaging properties of an interface wherein the index of refractions on the two sides of the interface are 1 and −1, respectively, when there is constructive interference between the portions of return measurement beam components of beam components 26C and 26D. When there is constructive interference between the measurement beam components, the complex amplitude of the interferometric conjugate image relative to the amplitude that would be achieved by a lossless otherwise equivalent imaging system with respect to pupil function is equal to $$2T(\phi)^{1/2} R(\phi)^{1/2}. \tag{3}$$

The return measurement beam components of beam components 26C and 26D are transmitted by refractive surface 42B as return measurement beam components of beam components 26A and 26B, respectively. The combination of a reflection and a transmission for each ray of the converging return measurement beam components of beam components 26A and 26B forming the interferometric conjugate image of spots in substrate 60 substantially compensates for departure of properties of beam-splitter 48 from properties of an ideal beam-splitter. The compensation is demonstrated by Equation (3). Function $T(\phi)^{1/2} R(\phi)^{1/2}$ has a maximum at $\phi = \pi/4$ and has only a second order dependence on changes of $\phi$ from $\pi/4$.

The average intensity transmission of catadioptric imaging system 10 is increased by a factor of 2 as demonstrated by Equation (3) than would otherwise be obtained as a result of use of the constructive interference of beams formed by the two different paths through the imaging system 10. The constructive interference is achieved in the manufacturing of catadioptric imaging system 10.

The next step is the imaging of output beam components 30A and 30B by imaging system 110 to an array of spots that coincide with the pixels of a multi-pixel detector such as a CCD to generate an array of electrical interference signals 72. The array of electrical interference signals is transmitted to signal processor and controller 80 for subsequent processing.

Conjugated quadratures of fields of the return measurement beam are obtained by single-, double-, bi-, and quad-homodyne detection methods in various different embodiments. For each of the homodyne detection methods, a set of four measurements of the array of electrical interference signals 72 is made. For each of the four measurements of the array of electrical interference signals 72, a known phase shift is introduced between the reference beam component and respective return measurement beam component of output beam components 30A and 30B. Non-limiting examples of a known sets of phase shifts comprise 0, π/4, π/2, and 3π/2 radians, mod 2π.

Input beam 24 comprises one frequency component for the single-homodyne detection method. For the bi-homodyne detection method, input beam 24 comprises two frequency components and for double- and quad-homodyne detection methods, input beam 24 comprises four frequency components. The phase shifts are generated in some embodiments by shifting the frequencies of frequency components of input beam 24 between known frequency values. There is a difference between the optical path lengths of the reference beam components and the respective return beam components of output beam components 30A and 30B in interferometer 10. As a consequence, a change in frequency of a frequency component of input beam 24 will generate a relative phase shift between the corresponding reference beam components and the respective return beam components of output beam components 30A and 30B.

For an optical path difference L between the optical path of reference beam components and the respective return measurement beam components of output beam components 30A and 30B, there will be for a frequency shift Δf of input beam 24 a corresponding phase shift φ between the return measurement beam and reference beam components of output beam components 30A and 30B where $$\varphi = 2\pi L \left( \frac{\Delta f}{c} \right) \quad (4)$$

and c is the free space speed of light. Note that L is not a physical path length difference and depends for example on a weighted averages of the index of refraction of the measurement beam and the return measurement beam paths. For an example of a phase shift φ=π, 3π, 5π, . . . and a value of L=0.25 m, the corresponding frequency shift Δf=600 MHz, 1.8 GHz, 3.0 GHz, . . . .

The frequencies of components of input beam 24 are determined by the mode of operation of source 18 and of beam-conditioner 22 according to control signals 92 and 74 generated by electronic processor and controller 80.

Two different modes of operation are described for the acquisition of the four arrays of electrical interference signal values. The first mode to be described is a step and stare mode wherein substrate 60 is stepped between fixed locations for which image information is desired. The second mode is a scanning mode. In the step and stare mode for generating a one-, a two-, or a three-dimensional image of substrate 60, substrate 60 is translated by stage 90 wherein substrate 60 is mounted on wafer chuck 84 and wafer chuck 84 mounted on stage 90. The position of stage 90 is controlled by transducer 82 according to servo control signal 78 from electronic processor and controller 80. The position of stage 90 is measured by metrology system 88 and position information acquired by metrology system 88 is transmitted to electronic processor and controller 80 to generate an error signal for use in the position control of stage 90. Metrology system 88 may comprise for example linear displacement and angular displacement interferometers and cap gauges.

Electronic processor and controller 80 translates stage 90 to a desired position and then the set of four arrays of electrical interference signal values corresponding to the set of four phase shifts 0, π/4, π/2, and 3π/2 mod 2ζ are acquired. After the acquisition of the set of four arrays of electrical interference signal values, electronic processor and controller 80 then repeats the procedure for the next desired position of stage 90. The elevation and angular orientation of substrate 60 is controlled by transducers 86A and 86B.

The second of the two modes for the acquisition of the set of four arrays of electrical interference signal values is next described wherein the set of four arrays of electrical interference signal values are obtained with the position of stage 90 being scanned continuously in one or more directions. In the scanning mode, source 18 is pulsed at times controlled by signal 92 from signal processor and controller 80. Source 18 is pulsed at times corresponding to the registration of the conjugate image of pinholes of pinhole array beam-splitter 12 with positions on and/or in substrate 60 for which image information is desired.

There are a number of different ways for producing a pulsed source [see Chapter 11 entitled "Lasers", *Handbook of Optics*, 1, 1995 (McGraw-Hill, New York) by W. Silfvast]. There will be a restriction on the duration or "pulse width" of a beam pulse $\tau_{p1}$ produced by source 18 as a result of the continuous scanning used in the scanning mode. Pulse width $\tau_{p1}$ will be a parameter that in part controls the limiting value for spatial resolution in the direction of a scan to a lower bound of $$\tau_{p1} V, \quad (5)$$

where V is the scan speed. For example, with a value of $\tau_{p1}=50$ nsec and a scan speed of v=0.20 m/sec, the limiting value of the spatial resolution $\tau_{p1} V$ in the direction of scan will be $$\rho_{p1} V = 10 \text{ nm.} \quad (6)$$

The frequencies of components of input beam 24 are controlled by signals 92 and 74 from signal processor and controller 80 to correspond to frequencies from a set of four frequencies that will yield the desired phase shifts of the set of four phase shifts between the reference and return measurement beam components of output beam components 30A and 30B. In the first mode for the acquisition of the electrical interference signal values, each set of four arrays of electrical interference signal values from the sets of arrays of four electrical interference signal values corresponding to the set of four phase shift values are generated by a single pixel of detector 70 for single- and bi-homodyne detection method, by two pixels of detector 70 for the quad-homodyne detection method, and by four pixels of detector 70 for the double-homodyne detection methods. In the second mode for the acquisition of the electrical interference signal values, each corresponding set of four electrical interference signal values from the sets of arrays of four electrical interference signal values are generated by a conjugate set of four different pixels of detector 70 for each of the four homodyne detection methods. Thus in the second mode of acquisition, the differences in pixel efficiency and the differences in sizes of pinholes in pinhole array beam-splitter 12 need to be compensated in the signal processing by signal processor and controller 80 to obtain conjugated quadratures of fields of return measurement beam components.

The advantage of the second or scanning mode is that the electrical interference signal values are acquired in a scanning mode which increases throughput of the interferometric confocal microscopy system.

The description of source 18 and beam-conditioner 22 is the same as corresponding portions of the description given for the source and beam-conditioner described in commonly owned U.S. Provisional Application No. 60/442,858 filed Jan. 27, 2003(ZI-47) and entitled "Apparatus and Method for Joint Measurements of Conjugated Quadratures of Fields of Reflected/Scattered Beams by an Object in Interferometry;" and U.S. patent Application filed Jan. 27, 2004 (ZI-47) and entitled "Apparatus and Method for Joint Measurements of Conjugated Quadratures of Fields of Reflected/Scattered and Transmitted Beams by an Object in Interferometry" both of which are by Henry A. Hill. The contents of both the cited U.S. Provisional Patent Application and the U.S. patent application are herein incorporated in their entirety by reference.

Reference is made to FIG. 1c where beam-conditioner 22 is first described as a two-frequency generator and a frequency-shifter. Beam-conditioner 22 may be operated to generate a beam 24 that has either a frequency-shifted, single frequency component or two frequency-shifted components.

Beam-conditioner 22 comprises acousto-optic modulators 1120, 1126, 1130, 1132, 1142, 1146, 1150, 1154, 1058, and 1062; beam-splitter 1168; and mirror 1166. Input beam 20 is incident on acousto-optic modulator 1120 with a plane of polarization parallel to the plane of FIG. 1c. A first portion of beam 20 is diffracted by acousto-optic modulator 1120 as beam 1122 and then by acousto-optic modulator 1126 as beam 1128 having a polarization parallel to the plane of FIG. 1d. A second portion of beam 20 is transmitted as a non-diffracted beam 1124 having a plane of polarization parallel to the plane of FIG. 1d. For beam-conditioner 22 operated to generate a frequency-shifted, single frequency component for beam 24, the acoustic power to acousto-optic modulator 1120 is switched between two states. One state is the off state where the amplitude of diffracted beam 1122 in zero and in the on state, the amplitude of non-diffracted beam 1124 is nominally zero. The on or off states of acousto-optic modulator 1120 is controlled by signal 74 generated by electronic processor and controller 80.

Acousto-optic modulators 1120 and 1126 may be of either the non-isotropic Bragg diffraction type or of the isotropic Bragg diffraction type. The frequency shifts introduced by acousto-optic modulators 1120 and 1126 are of the same sign and equal to ½ of a frequency shift $\Delta f$ that will generate in interferometer 10 a $\pi/2$ phase difference between a reference beam and a measurement beam that have a difference in frequency equal to the frequency shift. The direction of propagation of beam 1128 is parallel to the direction of propagation of beam 1124.

Figure 1D:
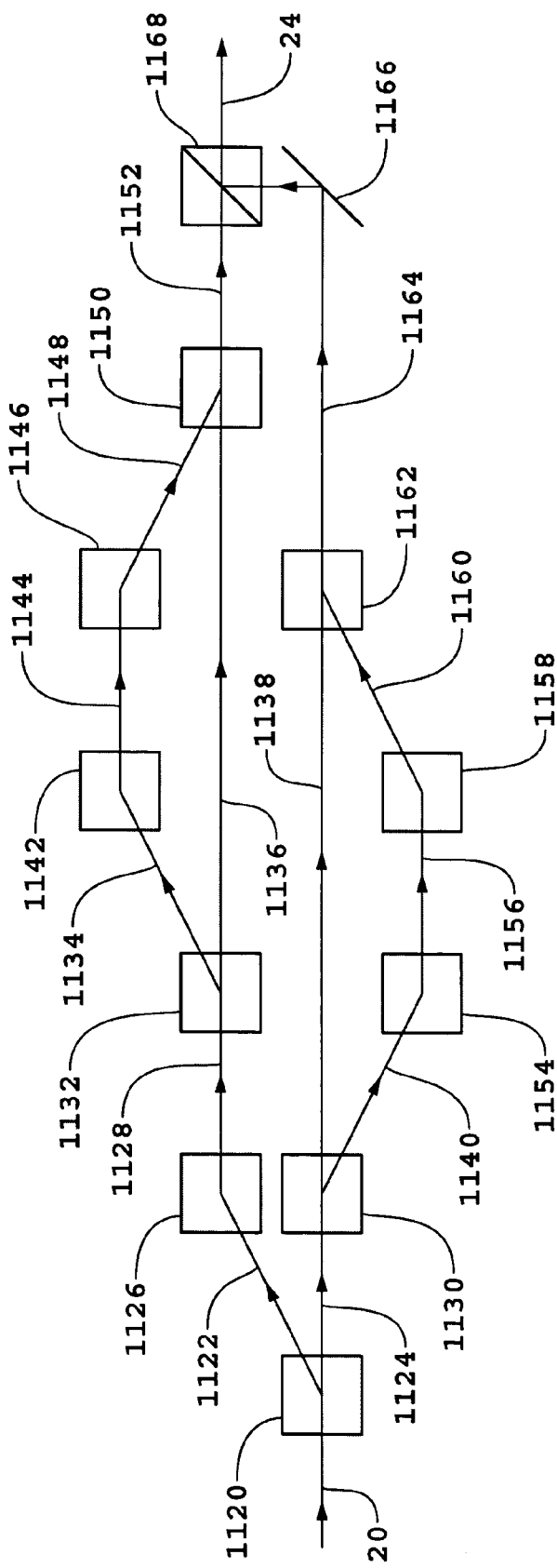
FIG. 1d is a schematic diagram of a beam-conditioner configured to operate in a two-frequency generator and frequency-shifter.

Continuing with FIG. 1d, beam 1128 is incident on acousto-optic modulator 1132 and is either diffracted by acousto-optic modulator 1132 as beam 1134 or transmitted by acousto-optic modulator 1132 as beam 1136 according to control signal 74 from electronic processor and controller 80 (see FIG. 1a). When beam 1134 is generated, beam 1134 is diffracted by acousto-optic modulators 1142, 1146, and 1150 as a frequency-shifted beam component of beam 1152. The frequency shifts introduced by acousto-optic modulators 1132, 1142, 1146, and 1150 are all in the same direction and equal in magnitude to $\Delta f/2$. Thus the net frequency shift introduced by acousto-optic modulators 1132, 1142, 1146, and 1150 is $\pm 2\Delta f$. The net frequency shift introduced by acousto-optic modulators 1120, 1126, 1132, 1142, 1146, and 1150 is $\Delta f \pm 2\Delta f$ and will generate a respective relative phase shift of $\pi/2$ and $\pi/2 \pm \pi$ between the respective reference and measurement beams in interferometer 10.

When beam 1136 is generated, beam 1136 is transmitted by acousto-optic modulator 1150 according to control signal 74 from electronic processor and controller 80 as a non-frequency shifted beam component of beam 1152. The net frequency shift introduced by acousto-optic modulators 1120, 1126, 1132, and 1150 is $\Delta f$ which will generate a respective relative phase shift of $\pi/2$ between the respective reference and measurement beams in interferometer 10.

Beam 1124 is incident on acousto-optic modulator 1130 and is either diffracted by acousto-optic modulator 1130 as beam 1140 or transmitted by acousto-optic modulator 1130 as beam 1138 according to control signal 74 from electronic processor and controller 80. When beam 1140 is generated, beam 1140 is diffracted by acousto-optic modulators 1154, 1158, and 1162 as a frequency-shifted beam component of beam 1164. The frequency shifts introduced by acousto-optic modulators 1130, 1154, 1158, and 1162 are all in the same direction and equal to $\pm \Delta f/2$. Thus the net frequency shift introduced by acousto-optic modulators 1130, 1154, 1158, and 1162 is $\pm 2\Delta f$ and will generate a relative phase shift of $\pi$ between the respective reference and measurement beams on transit through interferometer 10. The net frequency shift introduced by acousto-optic modulators 1120, 1130, 1154, 1158, and 1162 is $\pm 2\Delta f$ and will generate a respective relative phase shift of $\pm \pi$ between the respective reference and measurement beams on transit through interferometer 10

When beam 1138 is generated, beam 1138 is transmitted by acousto-optic modulator 1162 according to control signal 74 from electronic processor and controller 80 as a non-frequency shifted beam component of beam 1164. The corresponding frequency shift introduced by acousto-optic modulators 1120, 1130, and 1162 is 0 and will generate a respective relative phase shift of 0 between the respective reference and measurement beams on transit through interferometer 10.

Beams 1152 and 1164 are next combined by beam-splitter 1168 to form beam 24. Acousto-optic modulators 1120, 1126, 1130, 1132, 1142, 1146, 1150, 1154, 1058, and 1062 may be either of the non-isotropic Bragg diffraction type or of the isotropic Bragg diffraction type. Beams 1152 and 1164 are both orthogonally polarized in the plane of FIG. 1d for either non-isotropic Bragg diffraction type or of the isotropic Bragg diffraction type and beam-splitter 1168 is of the non-polarizing type.

With a continuation of the description of different ways to configure source 18 and beam-conditioner 22 to meet the input beam requirements of different embodiments, source 18 will preferably comprise a pulsed source. Each pulse of source 18 may comprise a single pulse or a train of pulses such as generated by a mode locked Q-switched Nd:YAG laser. A single pulse train is referenced herein as a pulse sequence and the expressions a pulse and a pulse sequence are used herein interchangeably.

Source 18 may be configured in certain embodiments to generate two or four frequencies by techniques such as described in a review article entitled "Tunable, Coherent Sources For High-Resolution VUV and XUV Spectroscopy" by B. P. Stoicheff, J. R. Banic, P. Herman, W. Jamroz, P. E. LaRocque, and R. H. Lipson in *Laser Techniques for Extreme Ultraviolet Spectroscopy*, T. J. McIlrath and R. R. Freeman, Eds. (American Institute of Physics) p 19 (1982) and references therein. The techniques include for example second and third harmonic generation and parametric generation such as described in the articles entitled "Generation of Ultraviolet and Vacuum Ultraviolet Radiation" by S. E. Harris, J. F. Young, A. H. Kung, D. M. Bloom, and G. C. Bjorklund in *Laser Spectroscopy I*, R. G. Brewer and A. Mooradi, Eds. (Plenum Press, New York) p 59, (1974) and "Generation of Tunable Picosecond VUV Radiation" by A. H. Kung, *Appl. Phys. Lett.* 25, p 653 (1974). The contents of the three cited articles are herein incorporated in their entirety by reference.

The output beam from source 18 comprising two or four frequency components are combined in beam-conditioner 22 by beam-splitters to form coextensive measurement and reference beams that are spatially coextensive as required in various embodiments. When source 18 is configured to furnish two or four frequency components, the frequency shifting of the various components required in certain embodiments may be introduced in source 18 for example by frequency modulation of input beams to parametric generators.

There are four different implementations of homodyne detection that may be used in some embodiments. The four different implementations are referred to as single-, double-, bi-, and quad-homodyne detection methods. For the single-homodyne detection method, input beam 24 comprises a single frequency component and a set of four measurements of the array of electrical interference signals 72 is made. For each of the four measurements of the array of electrical interference signals 72, a known phase shift is introduced between the reference beam component and respective return measurement beam components of output beam components 30A and 30B. The subsequent data processing procedure used to extract the conjugated quadratures of the reflected and/or scattered for an input beam comprising a single frequency component is described for example in commonly owned U.S. Pat. No. 6,445,453 (ZI-14) entitled "Scanning Interferometric Near-Field Confocal Microscopy" by Henry A. Hill, the contents of which are incorporated herein in their entirety by reference.

The double-homodyne detection method uses input beam 24 comprising four frequency components and four detectors to obtain measurements of electrical interference signals that are subsequently used to obtain conjugated quadratures. Each detector element of the four detector elements obtains four electrical interference signal values simultaneously to compute the conjugated quadratures for a field. Each of the four electrical interference signal values contains only information relevant to one orthogonal component of the conjugated quadratures. The double-homodyne detection used herein is related to the detection methods such as described in Section IV of the article by G. M D'ariano and M G. A. Paris entitled "Lower Bounds On Phase Sensitivity In Ideal And Feasible Measurements," *Phys. Rev. A* 49, 3022–3036 (1994). Accordingly, the double-homodyne detection method does not make joint determinations of conjugated quadratures of fields wherein each electrical interference signal value contains information simultaneously about each of two orthogonal components of the conjugated quadratures.

The bi- and quad-homodyne detection methods obtain measurements of electrical interference signals wherein each measured value of an electrical interference signal contains simultaneously information about two orthogonal components of conjugated quadratures. The two orthogonal components correspond to orthogonal components of conjugated quadratures such as described in cited U.S. Provisional Patent Application No. 60/442,858 and cited U.S. patent application filed Jan. 27, 2004 entitled "Apparatus and Method for Joint Measurements of Conjugated Quadratures of Fields of Reflected/Scattered and Transmitted Beams by an Object in Interferometry."

The processing of the measured arrays of sets of four measured electrical interference signal values for the determination of conjugated quadratures of fields of return measurement beams is next described for the bi-homodyne detection method. The general description of the processing for bi- and quad-homodyne detection methods for the determination of joint measurements of conjugated quadratures of fields of return measurement beams is the same as the corresponding portion of the description given in the cited U.S. Provisional Application No. 60/442,858 and cited U.S. patent application filed Jan. 27, 2004 (ZI-47) and entitled "Apparatus and Method for Joint Measurements of Conjugated Quadratures of Fields of Reflected/Scattered and Transmitted Beams by an Object in Interferometry."

Referring to the bi-homodyne detection method wherein conjugated quadratures are obtained jointly, a set of four electrical interference signal values is obtained for each spot on and/or in substrate 60 being imaged. The set of four electrical interference signal values $S_j$, $j=1,2,3,4$ used for obtaining conjugated quadratures of fields for a single a spot on and/or in substrate 60 being imaged is represented for the bi-homodyne detection within a scale factor by the formula $$S_j = P_j \begin{Bmatrix} \xi_j^2 |A_1|^2 + \zeta_j^2 |B_1|^2 + \eta_j^2 |C_1|^2 + \zeta_j \eta_j 2|B_1||C_1|\cos\varphi_{B_1 C_1 \varepsilon_j} + \\ \xi_j \zeta_j 2|A_1||B_1|\cos\varphi_{A_1 B_1 \varepsilon_j} + \varepsilon_j \xi_j \eta_j 2|A_1||C_1|\cos\varphi_{A_1 C_1} + \\ \xi_j^2 |A_2|^2 + \zeta_j^2 |B_2|^2 + \eta_j^2 |C_2|^2 + \zeta_j \eta_j 2|B_2||C_2|\cos\varphi_{B_2 C_2 \gamma_j} + \\ \xi_j \zeta_j 2|A_2||B_2|\cos\varphi_{A_2 B_2 \gamma_j} + \gamma_j \xi_j \eta_j 2|A_2||C_2|\cos\varphi_{A_2 C_2} \end{Bmatrix} \quad (7)$$

where coefficients $A_1$ and $A_2$ represent the amplitudes of the reference beams corresponding to first and second frequency components of the input beam; coefficients $B_1$ and $B_2$ represent the amplitudes of background beams corresponding to reference beams $A_1$ and $A_2$, respectively; coefficients $C_1$ and $C_2$ represent the amplitudes of the return measurement beams corresponding to reference beams $A_1$ and $A_2$, respectively; $P_j$ represents the integrated intensity of the first frequency component of the input beam in pulse j; and the values for $\epsilon_j$ and $\gamma_j$ are listed in Table 1. The relative phase shifts between reference and return measurement beam for the two frequency components are an odd harmonic of $\pm\pi$. The change in the values of $\epsilon_j$ and $\gamma_j$ from 1 to –1 or from –1 to 1 correspond to changes in relative phases of an odd harmonic of $\pm\pi$ for respective reference and measurement beams associated with changes in frequencies of components of input beam 24. The coefficients $\xi_j$, $\zeta_j$, and $\eta_j$ represent effects of variations in properties of a conjugate set of four pinholes such as size and shape used in the generation of the spot on and/or in the substrate and the sensitivities of a conjugate set of four detector pixels corresponding to the spot on and/or in substrate 60 for the reference beam, the background beam, and the return measurement beam, respectively. The conjugate set of four pinholes comprise pinholes of pinhole array beam-splitter 12 that are conjugate to a spot in or on the substrate being imaged at different times during a scan.

TABLE 1

| j | $\epsilon_j$ | $\gamma_j$ | $\epsilon_j\gamma_j$ |
|---|---|---|---|
| 1 | 1 | 1 | 1 |
| 2 | –1 | –1 | 1 |
| 3 | –1 | 1 | –1 |
| 4 | 1 | –1 | –1 |

It is assumed in Equation (7) that the ratio of $|A_2|/|A_1|$ is not dependent on j or on the value of $P_j$. In order to simplify the representation of $S_j$ so as to project the important features without departing from either the scope or spirit of the present invention, it is also assumed in Equation (7) that the ratio of the amplitudes of the return measurement beams corresponding to $A_2$ and $A_1$ is not dependent on j or on the value of $P_j$. However, the ratio $|C_2|/|C_1|$ will be different from the ratio $|A_2|/|A_1|$ when the ratio of the amplitudes of the measurement beam components corresponding to $A_2$ and $A_1$ are different from the ratio $|A_2|/|A_1|$.

Noting that $\cos \phi_{A_2C_2} = \pm \sin \phi_{A_1C_1}$ by the control of the relative phase shifts between corresponding reference and return measurement beam components of beam components 30A and 30B, Equation (7) may be rewritten as $$S_j = P_j \begin{Bmatrix} \xi_j^2(|A_1|^2 + |A_2|^2) + \zeta_j^2(|B_1|^2 + |B_2|^2) + \eta_j^2(|C_1|^2 + |C_2|^2) + \\ 2\xi_j\zeta_j(|A_1||B_1|\cos\varphi_{A_1B_1\varepsilon_j} + |A_2||B_2|\cos\varphi_{A_2B_2\gamma_j}) + \\ 2\xi_j\eta_j\left[\varepsilon_j|A_1||C_1|\cos\varphi_{A_1C_1} + \gamma_j\left(\frac{|A_2|}{|A_1|}\right)\left(\frac{|C_2|}{|C_1|}\right)|A_1||C_1|\sin\varphi_{A_1C_1}\right] + \\ 2\zeta_j\eta_j(\varepsilon_j|B_1||C_1|\cos\varphi_{B_1C_1\varepsilon_j} + \gamma_j|B_2||C_2|\cos\varphi_{B_2C_2\gamma_j}) \end{Bmatrix} \quad (8)$$

where the relationship $\cos \phi_{A_2C_2} = \pm \sin \phi_{A_1C_1}$ has been used without departing from either the scope or spirit of the present invention.

The change in phase $\phi_{A_1B_1\varepsilon_j}$ for a change in $\varepsilon_j$ and the change in phase $\phi_{A_2B_2\gamma_j}$ for a change in $\gamma_j$ may be different from $\pi$ in embodiments depending on where and how the background beam is generated. It may be of value in evaluating the effects of the background beams to note that the factor $\cos \phi_{B_1C_1\varepsilon_j}$ may be written as $\cos[_{A_1C_1} + (\phi_{B_1C_1\varepsilon_j} - \phi_{A_1C_1})]$ where the phase difference $(\phi_{B_1C_1\varepsilon_j} - \phi_{A_1C_1})$ is the same as the phase $\phi_{B_1C_1\varepsilon_j}$, i.e., $\cos \phi_{B_1C_1\varepsilon_j} = \cos(\phi_{A_1C_1} + \phi_{B_1C_1\varepsilon_j})$.

It is evident from inspection of Equation (8) that the term in Equation (8) corresponding to the component of conjugated quadratures $|C_1|\cos \phi_{A_1C_1}$ is a rectangular function that has a mean value of zero and is symmetric about j=2.5 since $\varepsilon_j$ is symmetric about j=2.5. In addition term in Equation (8) corresponding to the component of conjugated quadratures $|C_1|\sin \phi_{A_1C_1}$ in Equation (8) is a rectangular function that has a mean value of zero and is antisymmetric about j=2.5 since $\gamma_j$ is a antisymmetric function about j=2.5. Another important property by the design of the bi-homodyne detection method is that the conjugated quadratures $|C_1|\cos \phi_{A_1C_1}$ and $|C_1|\sin \phi_{A_1C_1}$ terms in Equation (8) are orthogonal over the range of j=1,2,3,4 since $\varepsilon_j$ and $\gamma_j$ are orthogonal over the range of j=1,2,3,4, i.e., $\Sigma_{j=1}^{4}\varepsilon_j\gamma_j=0$.

Information about conjugated quadratures components $|C_1|\cos \phi_{A_1C_1}$ and $|C_1|\sin \phi_{A_1C_1}$ are obtained using the symmetric and antisymmetric properties and orthogonality property of the conjugated quadratures of terms in (8) as represented by the following digital filters to the signal values $S_j$:

$$F_1(S) = \sum_{j=1}^{4} \varepsilon_j \frac{S_j}{P'_j \xi'^2_j} = (|A_1|^2 + |A_2|^2) \sum_{j=1}^{4} \varepsilon_j \left(\frac{P_j}{P'_j}\right)\left(\frac{\xi_j^2}{\xi'^2_j}\right) + \quad (9)$$

$$(|B_1|^2 + |B_2|^2)\sum_{j=1}^{4} \varepsilon_j\left(\frac{P_j}{P'_j}\right)\left(\frac{\zeta_j^2}{\xi'^2_j}\right) + (|C_1|^2 + |C_2|^2)\sum_{j=1}^{4}\varepsilon_j\left(\frac{P_j}{P'_j}\right)\left(\frac{\eta_j^2}{\xi'^2_j}\right) +$$

$$2|A_1||C_1|\cos\varphi_{A_1C_1}\sum_{j=1}^{4}\varepsilon_j\left(\frac{P_j}{P'_j}\right)\left(\frac{\xi_j\eta_j}{\xi'^2_j}\right) +$$

$$2\left(\frac{|A_2|}{|A_1|}\right)\left(\frac{|C_2|}{|C_1|}\right)|A_1||C_1|\sin\varphi_{A_1C_1}\sum_{j=1}^{4}\varepsilon_j\gamma_j\left(\frac{P_j}{P'_j}\right)\left(\frac{\xi_j\eta_j}{\xi'^2_j}\right)+$$

$$2|A_1||B_1|\sum_{j=1}^{4}\varepsilon_j\left(\frac{P_j}{P'_j}\right)\left(\frac{\xi_j\zeta_j}{\xi'^2_j}\right)\cos\varphi_{A_1B_1\varepsilon_j}+$$

$$2|A_2||B_2|\sum_{j=1}^{4}\left(\frac{P_j}{P'_j}\right)\left(\frac{\zeta_j\eta_j}{\xi'^2_j}\right)\cos\varphi_{A_2B_2\gamma_j}+$$

$$2|B_1||C_1|\sum_{j=1}^{4}\left(\frac{P_j}{P'_j}\right)\left(\frac{\zeta_j\eta_j}{\xi'^2_j}\right)\cos\varphi_{B_1C_1\varepsilon_j}+$$

$$2|B_2||C_2|\sum_{j=1}^{4}\varepsilon_j\gamma_j\left(\frac{P_j}{P'_j}\right)\left(\frac{\zeta_j\eta_j}{\xi'^2_j}\right)\cos\varphi_{B_2C_2\gamma_j}.$$

$$F_2(S) = \sum_{j=1}^{4} \gamma_j \frac{S_j}{P'_j \xi'^2_j} = (|A_1|^2 + |A_2|^2) \sum_{j=1}^{4} \gamma_j \left(\frac{P_j}{P'_j}\right)\left(\frac{\xi^2_j}{\xi'^2_j}\right) + \quad (10)$$

$$(|B_1|^2 + |B_2|^2) \sum_{j=1}^{4} \gamma_j \left(\frac{P_j}{P'_j}\right)\left(\frac{\zeta^2_j}{\xi'^2_j}\right) + (|C_1|^2 + |C_2|^2) \sum_{j=1}^{4} \gamma_j \left(\frac{P_j}{P'_j}\right)\left(\frac{\eta^2_j}{\xi'^2_j}\right) +$$

$$2|A_1||C_1|\cos\varphi_{A_1C_1} \sum_{j=1}^{4} \varepsilon_j \gamma_j \left(\frac{P_j}{P'_j}\right)\left(\frac{\xi_j \eta_j}{\xi'^2_j}\right) +$$

$$2\left(\frac{|A_2|}{|A_1|}\right)\left(\frac{|C_2|}{|C_1|}\right)|A_1||C_1|\sin\varphi_{A_1C_1} \sum_{j=1}^{4} \left(\frac{P_j}{P'_j}\right)\left(\frac{\xi_j \eta_j}{\xi'^2_j}\right) +$$

$$2|A_1||B_1| \sum_{j=1}^{4} \gamma_j \left(\frac{P_j}{P'_j}\right)\left(\frac{\xi_j \zeta_j}{\xi'^2_j}\right) \cos\varphi_{A_1B_1\varepsilon_j} +$$

$$2|A_2||B_2| \sum_{j=1}^{4} \gamma_j \left(\frac{P_j}{P'_j}\right)\left(\frac{\xi_j \zeta_j}{\xi'^2_j}\right) \cos\varphi_{A_2B_2\gamma_j} +$$

$$2|B_1||C_1| \sum_{j=1}^{4} \varepsilon_j \gamma_j \left(\frac{P_j}{P'_j}\right)\left(\frac{\zeta_j \eta_j}{\xi'^2_j}\right) \cos\varphi_{B_1C_1\varepsilon_j} +$$

$$2|B_2||C_2| \sum_{j=1}^{4} \left(\frac{P_j}{P'_j}\right)\left(\frac{\zeta_j \eta_j}{\xi'^2_j}\right) \cos\varphi_{B_2C_2\gamma_j}$$

where and $\xi'_j$ and $P'_j$ are values used in the digital filters to represent $\xi_j$ and $P_j$ The parameter $$\left[\left(\frac{|A_2|}{|A_1|}\right)\left(\frac{|C_2|}{|C_1|}\right)\right] \quad (11)$$

in Equations (9) and (10) needs to be determined in order complete the determination of a conjugated quadratures. The parameter given in Equation (11) can be measured for example by introducing π/2 phase shifts into the relative phase of the reference beam and the measurement beam and repeating the measurement for the conjugated quadratures. The ratio of the amplitudes of the conjugated quadratures corresponding to (sin $\phi_{A_1C_1}$/cos $\phi_{A_1C_1}$) from the first measurement divided by the ratio of the amplitudes of the conjugated quadratures corresponding to (sin $\phi_{A_1C_1}$/cos $\phi_{A_1C_1}$) from the second measurement is equal to $$\left[\left(\frac{|A_2|}{|A_1|}\right)\left(\frac{|C_2|}{|C_1|}\right)\right]^2. \quad (12)$$

Note that certain of the factors in Equations (9) and (10) have nominal values of 4 within a scale factor, e.g., $$\sum_{j=1}^{4} \left(\frac{P_j}{P'_j}\right)\left(\frac{\xi_j \eta_j}{\xi'^2_j}\right) \simeq 4, \quad \sum_{j=1}^{4} \left(\frac{P_j}{P'_j}\right)\left(\frac{\zeta_j \eta_j}{\xi'^2_j}\right) \simeq 4. \quad (13)$$

The scale factors correspond to the average values for the ratios of $\xi'_j/\eta_j$ and $\xi'_j/\zeta_j$, respectively, assuming that the average value of $P_j/P'_j \cong 1$. Certain other of the factors in Equations (9) and (10) have nominal values of zero, e.g., $$\sum_{j=1}^{4} \varepsilon_j \left(\frac{P_j}{P'_j}\right)\left(\frac{\xi^2_j}{\xi'^2_j}\right) \simeq 0, \quad \sum_{j=1}^{4} \varepsilon_j \left(\frac{P_j}{P'_j}\right)\left(\frac{\zeta^2_j}{\xi'^2_j}\right) \simeq 0, \quad (14)$$

$$\sum_{j=1}^{4} \varepsilon_j \left(\frac{P_j}{P'_j}\right)\left(\frac{\eta^2_j}{\xi'^2_j}\right) \simeq 0,$$

$$\sum_{j=1}^{4} \gamma_j \left(\frac{P_j}{P'_j}\right)\left(\frac{\xi^2_j}{\xi'^2_j}\right) \simeq 0, \quad \sum_{j=1}^{4} \gamma_j \left(\frac{P_j}{P'_j}\right)\left(\frac{\zeta^2_j}{\xi'^2_j}\right) \simeq 0,$$

$$\sum_{j=1}^{4} \gamma_j \left(\frac{P_j}{P'_j}\right)\left(\frac{\eta^2_j}{\xi'^2_j}\right) \simeq 0,$$

$$\sum_{j=1}^{4} \varepsilon_j \gamma_j \left(\frac{P_j}{P'_j}\right)\left(\frac{\xi_j \eta_j}{\xi'^2_j}\right) \simeq 0.$$

The remaining factors, $$\sum_{j=1}^{4} \varepsilon_j \left(\frac{P_j}{P'_j}\right)\left(\frac{\xi_j \zeta_j}{\xi'^2_j}\right) \cos\varphi_{A_1B_1\varepsilon_j}, \quad \sum_{j=1}^{4} \varepsilon_j \left(\frac{P_j}{P'_j}\right)\left(\frac{\xi_j \zeta_j}{\xi'^2_j}\right) \cos\varphi_{A_2B_2\gamma_j}, \quad (15)$$

-continued $$\sum_{j=1}^{4}\left(\frac{P_j}{P'_j}\right)\left(\frac{\zeta_j\eta_j}{\xi'^2_j}\right)\cos\varphi_{B_1C_1\varepsilon_j}, \sum_{j=1}^{4}\varepsilon_j\gamma_j\left(\frac{P_j}{P'_j}\right)\left(\frac{\zeta_j\eta_j}{\xi'^2_j}\right)\cos\varphi_{B_2C_2\gamma_j},$$

$$\sum_{j=1}^{4}\gamma_j\left(\frac{P_j}{P'_j}\right)\left(\frac{\xi_j\zeta_j}{\xi'^2_j}\right)\cos\varphi_{A_1B_1\varepsilon_j}, \sum_{j=1}^{4}\gamma_j\left(\frac{P_j}{P'_j}\right)\left(\frac{\xi_j\zeta_j}{\xi'^2_j}\right)\cos\varphi_{A_2B_2\gamma_j},$$

$$\sum_{j=1}^{4}\varepsilon_j\gamma_j\left(\frac{P_j}{P'_j}\right)\left(\frac{\zeta_j\eta_j}{\xi'^2_j}\right)\cos\varphi_{B_1C_1\varepsilon_j}, \sum_{j=1}^{4}\left(\frac{P_j}{P'_j}\right)\left(\frac{\zeta_j\eta_j}{\xi'^2_j}\right)\cos\varphi_{B_2C_2\gamma_j},$$

will have nominal magnitudes ranging from approximately zero to approximately 4 times a cosine factor and either the average value of factor $(P_j/P'_j)(\xi_j\zeta_j/\xi'^2_j)$ or $(P_j/P'_j)(\zeta_j\eta_j/\xi'^2_j)$ depending on the properties respective phases. For the portion of the background with phases that do not track to a first approximation the phases of the respective measurement beams, the magnitudes of all of the terms listed in the Equation (15) will be approximately zero. For the portion of the background with phases that do track to a first approximation the phases of the respective measurement beams, the magnitudes of the terms listed in Equation (15) will be approximately 4 times a cosine factor and either the average value of factor $(P_j/P'_j)(\xi_j\zeta_j/\xi'^2_j)$ and or factor $(P_j/P'_j)(\zeta_j\eta_j/\xi'^2_j)$.

The two largest terms in Equations (9) and (10) are generally the terms that have the factors $(|A_1|^2+|A_2|^2)$ and $(|B_1|^2+|B_2|^2)$. However, the corresponding terms are substantially eliminated by selection of values for the terms that have $(|A_1|^2+|A_2|^2)$ as a factor and by the design of $\zeta_j$ values for the terms that have $(|B_1|^2+|B_2|^2)$ as a factor as shown in Equation (14).

The largest contribution from effects of background is represented by the contribution to the interference term between the reference beam and the portion of the background beam generated by the measurement beam. This portion of the effect of the background can be measured by measuring the corresponding conjugated quadratures of the portion of the background with the return measurement beam component of output beam components 30A and 30B set equal to zero, i.e., measuring the respective electrical interference signals $S_j$ with substrate 60 removed and with either $|A_2|=0$ or $|A_1|=0$ and visa versa. The measured conjugated quadratures of the portion of the effect of the background can than used to compensate for the respective background effects beneficially in an end use application if required.

Information about the largest contribution from effects of background amplitude $\xi_j\zeta_j 2A_1B_1$ and phase $\varphi_{A_1B_1\varepsilon_j}$ of the interference term between the reference beam and the background beam generated by the measurement beam may be obtained by measuring $S_j$ for j=1,2,3,4 as a function of relative phase shift between reference beam and the measurement beam with substrate 60 removed and either $|A_2|1=0$ or $|A_1|=0$ and visa versa and Fourier analyzing the measured values of $S_j$. Such information can be used to help identify the origin of the respective background.

Other techniques may be incorporated into various embodiments to reduce and/or compensate for the effects of background beams without departing from either the scope or spirit of the present invention such as described in commonly owned U.S. Pat. No. 5,760,901 entitled "Method And Apparatus For Confocal Interference Microscopy With Background Amplitude Reduction and Compensation," U.S. Pat. No. 5,915,048 entitled "Method and Apparatus for Discrimination In-Focus Images from Out-of-Focus Light Signals from Background and Foreground Light Sources," and U.S. Pat. No. 6,480,285 B1 wherein each of three patents are by Henry A. Hill. The contents of each of the three cited patents are herein incorporated in their entirety by reference.

The selection of values $\xi'_j$ for is based on information about coefficients for j=1,2,3,4 that may be obtained by measuring the $S_j$ for j=1,2,3,4 with only the reference beam present in the interferometer system. In certain embodiments, this may correspond simply blocking the measurement beam components of input beam 24 and in certain other embodiments, this may correspond to simply measuring the $S_j$ for j=1,2,3,4 with substrate 60 removed. A test of the correctness of a set of values for $\xi'_j$ is the degree to which the $(|A_1|^2+|A_2|^2)$ terms in Equations (9) and (10) are zero.

Information about coefficients $\xi_j\eta_j$ for j=1,2,3,4 may be obtained by scanning an artifact past the spots corresponding to the respective four conjugate detector pixels with either $|A_2|=0$ or $|A_1|=0$ and measuring the conjugated quadratures component $2|A_1||C_1|\cos\phi_{A_1C_1}$ or $2|A_1||C_1|\sin\phi_{A_1C_1}$, respectively. A change in the amplitude of $2|A_1||C_1|\cos\phi_{A_1C_1}$ or $2|A_1||C_1|\sin\phi_{A_1C_1}$ term corresponds to a variation in $\xi_j\eta_j$ as a function of j. Information about the coefficients $\xi_j\eta_j$ for j=1,2,3,4 may be used for example to monitor the stability of one or more elements of interferometer system 10.

The bi-homodyne detection method described herein is a robust technique for the determination of conjugated quadratures of fields. First, the conjugated quadratures amplitudes $|C_1|\cos\phi_{A_1C_1}$ and $|C_1|\sin\phi_{A_1C_1}$ are the primary terms in the digitally filtered values $F_1(S)$ and $F_2(S)$, respectively, as expressed by Equations (9) and (10), respectively, since as noted in the discussion with respect to Equation (14), the terms with the factors $(|A_1|^2+|A_2|^2)$ and $(|B_1|^2+|B_2|^2)$ are substantially zero.

Secondly, the coefficients of $|C_1|\cos\phi_{A_1C_1}$ and $|C_2|\sin\phi_{A_1C_1}$ terms in Equations (9) and (10) are identical. Thus highly accurate measurements of the interference terms between the return measurement beam and the reference beam with respect to amplitudes and phases, i.e., highly accurate measurements of conjugated quadratures of fields can be measured wherein first order variations in $\xi_j$ and first order errors in normalizations such as $(P_j/P'_j)$ and $(\xi_j^2/\xi'^2_j)$ enter in only second or higher order. This property translates in a significant advantage. Also, the contributions to each component of the conjugated quadratures $|C_1|\cos\phi_{A_1C_1}$ and $|C_1|\sin\phi_{A_1C_1}$ from a respective set of four electrical interference signal values have the same window function and thus are obtained as jointly determined values.

Other distinguishing features of the bi-homodyne technique described herein are evident in Equations (9) and (10): the coefficients of the conjugated quadratures components $|C_1|\cos\phi_{A_1C_1}$ and $|C_1|\sin\phi_{A_1C_1}$ in Equations (9) and (10), respectively, and listed as the first equation in Equations (13) are identical independent of errors in assumed values for $\xi'_j$; the coefficients of the conjugated quadratures amplitudes $|C_1|\sin\phi_{A_1C_1}$ and $|C_1|\cos\phi_{A_1C_1}$ in Equations (9) and (10), respectively, and listed as the last equation in Equations (14) are identical independent of errors in assumed values for $\xi'_j$. Thus highly accurate values of the phases corresponding to conjugated quadratures can be measured with first order variations in $\xi_j$ and first order errors in normalizations such as $(P_j/P'_j)$ and $(\xi_j^2/\xi'^2_j)$ enter in only through some high order effect.

It is also evident that since the conjugated quadratures of fields are obtained jointly when using the bi-homodyne detection method, there is a significant reduction in the potential for an error in tracking phase as a result of a phase redundancy unlike the situation possible in single-homodyne detection of conjugated quadratures of fields.

The description of processing used in the single-homodyne detection method which may be considered a special case of bi-homodyne detection method is also the same as the description given for the bi-homodyne detection with either of the amplitudes $A_2$ or $A_1$ set equal to zero except that the conjugated quadratures obtained in the special case are not obtained as jointly measured quantities.

The first embodiment includes catadioptric imaging system 110 and secondary imaging system 220 as described herein. Source 18 and beam-conditioner 22 are configured to generate input beam 24 with a single frequency component.

In the first embodiment, multi-pixel detector 70 may comprise a frame transfer CCD that is configured such that one set of CCD pixel signal values may be generated and subsequently stored on the CCD wafer while a frame of a second set of CCD pixel signal values may be generated before a readout of both the first and second set of the CCD signal values is made. The time required to store the first set of CCD signal values is generally much less than the time required to readout a set of CCD signal values for a frame transfer CCD. Thus, the advantage of the use of a frame transfer CCD is that the time between two consecutive pulses of input beam 20 and the corresponding time between measurements of electrical interference signal values can be much less than when using a non-frame transfer CCD.

A second embodiment is described that includes the interferometric confocal microscopy system of the first embodiment operated for joint measurement of conjugated quadratures using the bi-homodyne detection method. In the second embodiment, beam-conditioner 22 is operated to generate beam 24 comprising two frequency-shifted components.

For generation of two frequency-shifted components of beam 24, the acoustic power to acousto-optic modulator 1120 (see FIG. 1d) is adjusted so that the intensity of diffracted beam 1122 and the intensity of non-diffracted beam 1124 are the same. The level of acoustic power in acousto-optic modulator 1120 is controlled by signal 74 generated by electronic processor and controller 80.

The remaining description of the second embodiment is the same as corresponding portions of the description given of the first embodiment.

Figure 2:
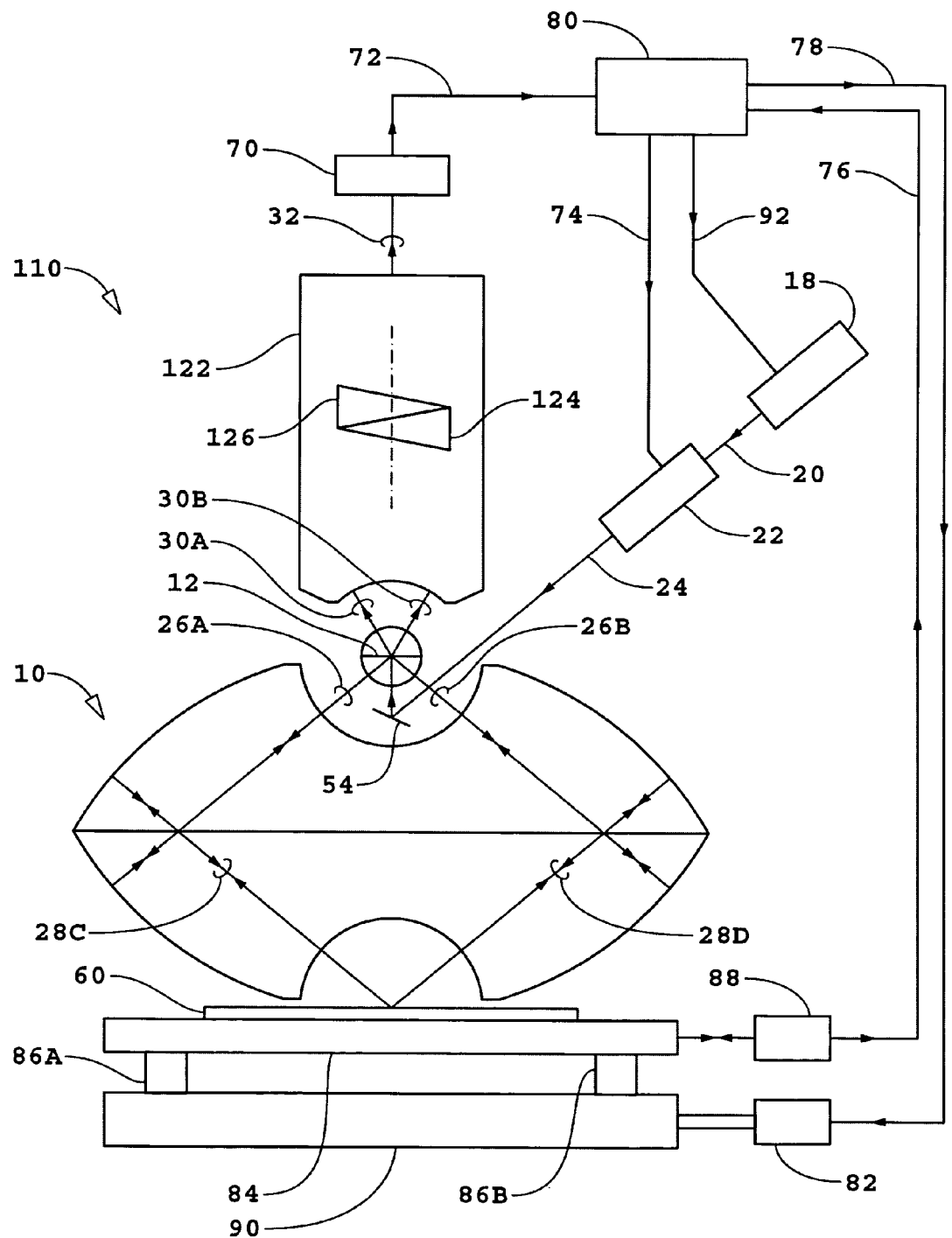
FIG. 2 is schematic diagram of a third embodiment that uses a variant of the quad-homodyne detection method.

A third embodiment is shown diagrammatically in FIG. 2. The third embodiment obtains joint measurements of conjugated quadratures of fields of measurement beams reflected/scattered by a substrate 60 using interferometric confocal microscopy system 110 and a variant of the quad-homodyne detection method. Source 18 and beam-conditioner 22 are configured such that input beam 24 comprises 2 frequency components.

The third embodiment includes the interferometric confocal microscopy system of the first embodiment with microscope 110 of the first embodiment replaced by microscope 120 as shown in FIG. 2. Microscope 120 comprises a low power microscope and a dispersive element comprising prisms 124 and 126. Prisms 124 and 126 form a direct vision prism. Other forms of a dispersive element may be used such as a grating without departing from the scope or spirit of the present invention. The difference in frequencies of components of output beam 30A and 30B corresponding to amplitudes $A_1$ and $B_1$ is chosen in conjunction with the design of the dispersion of the direct vision prism such that the $A_1$ and $B_1$ components of output beam 30A and 30B are directed to two different sets of pixels of detector 70. Beam 24 comprises two frequency components.

The sets of four arrays of electrical interference values are obtained in two read out cycles instead of four read out cycles such as for the first embodiment. The description of the processing of the sets of four arrays of electrical interference signal values to obtain the respective determined conjugated quadratures is the same as corresponding portions of the description for the processing used in the first embodiment of the respective sets of four arrays of electrical signal values to obtain the corresponding conjugated quadratures.

A first variant of the third embodiment uses the double-homodyne detection method for generation of non-joint measurements of conjugated quadratures. The first variant of the third embodiment comprises the interferometric confocal microscopy system of the third embodiment with input beam 24 comprising four frequency components and with the design of the dispersion of the direct vision prism and the selection of the four frequencies such that each of the four frequency components of beam 32 are directed to different pixels of detector 70. Four arrays of electrical interference signal values are obtained simultaneously and processed for amplitudes of conjugated quadratures using the procedure described herein for the single-homodyne detection method.

A second variant of the third embodiment uses the quad-homodyne detection method for generation of joint measurements of conjugated quadratures. The second variant of the third embodiment comprises the interferometric confocal microscopy system of the third embodiment with input beam 24 comprising four frequency components and with the design of the dispersion of the direct vision prism and the selection of the four frequencies such that pairs of the four frequency components of beam 32 are directed to different pixels of detector 70.

Referring to the quad-homodyne detection method used in the second variant of the third embodiment and other embodiments, a set of four electrical interference signal values are obtained for each spot on and/or in substrate 60 being imaged with two read out cycles or with two pulse sequences from source 18 and beam-conditioner 22. The set of four electrical interference signals $S_j$, j=1,2,3,4 used for obtaining conjugated quadratures of fields for a single a spot on and/or in a substrate being imaged is represented within a scale factor for the quad-homodyne detection by the formulae $$S_1 = P_1 \begin{Bmatrix} \xi_1^2 |A_1|^2 + \zeta_1^2 |B_1|^2 + \eta_1^2 |C_1|^2 + \zeta_1 \eta_1 2 |B_1||C_1| \cos\varphi_{B_1 C_1 \varepsilon_1} + \\ \xi_1 \zeta_1 2 |A_1||B_1| \cos\varphi_{A_1 B_1 \varepsilon_1} + \varepsilon_1 \xi_1 \eta_1 2 |A_1||C_1| \cos\varphi_{A_1 C_1} + \\ \xi_1^2 |A_2|^2 + \zeta_1^2 |B_2|^2 + \eta_1^2 |C_2|^2 + \zeta_1 \eta_1 2 |B_2||C_2| \cos\varphi_{B_2 C_2 \gamma_1} + \\ \xi_1 \zeta_1 2 |A_2||B_2| \cos\varphi_{A_2 B_2 \gamma_1} + \gamma_1 \xi_1 \eta_1 2 |A_2||C_2| \cos\varphi_{A_2 C_2} \end{Bmatrix}, \quad (16)$$

-continued $$S_2 = P_1 \begin{Bmatrix} \xi_2^2|A_3|^2 + \zeta_2^2|B_3|^2 + \eta_2^2|C_3|^2 + \zeta_2\eta_2 2|B_3||C_3|\cos\varphi_{B_3C_3\varepsilon_2} + \\ \xi_2\zeta_2 2|A_3||B_3|\cos\varphi_{A_3B_3\varepsilon_2} + \varepsilon_2\xi_2\eta_2 2|A_3||C_3|\cos\varphi_{A_3C_3} + \\ \xi_2^2|A_4|^2 + \zeta_2^2|B_4|^2 + \eta_2^2|C_4|^2 + \zeta_2\eta_2 2|B_4||C_4|\cos\varphi_{B_4C_4\gamma_2} + \\ \xi_2\zeta_2 2|A_4||B_4|\cos\varphi_{A_4B_4\gamma_2} + \gamma_2\xi_2\eta_2 2|A_4||C_4|\cos\varphi_{A_4C_4} \end{Bmatrix} \quad (17)$$

$$S_3 = P_2 \begin{Bmatrix} \xi_1^2|A_1|^2 + \zeta_1^2|B_1|^2 + \eta_1^2|C_1|^2 + \zeta_1\eta_1 2|B_1||C_1|\cos\varphi_{B_1C_1\varepsilon_3} + \\ \xi_1\zeta_1 2|A_1||B_1|\cos\varphi_{A_1B_1\varepsilon_3} + \varepsilon_3\xi_1\eta_1 2|A_1||C_1|\cos\varphi_{A_1C_1} + \\ \xi_1^2|A_2|^2 + \zeta_1^2|B_2|^2 + \eta_1^2|C_2|^2 + \zeta_1\eta_1 2|B_2||C_2|\cos\varphi_{B_2C_2\gamma_3} + \\ \xi_1\zeta_1 2|A_2||B_2|\cos\varphi_{A_2B_2\gamma_3} + \gamma_3\xi_1\eta_1 2|A_2||C_2|\cos\varphi_{A_2C_2} \end{Bmatrix} \quad (18)$$

$$S_4 = P_2 \begin{Bmatrix} \xi_2^2|A_3|^2 + \zeta_2^2|B_3|^2 + \eta_2^2|C_3|^2 + \zeta_2\eta_2 2|B_3||C_3|\cos\varphi_{B_3C_3\varepsilon_4} + \\ \xi_2\zeta_2 2|A_3||B_3|\cos\varphi_{A_3B_3\varepsilon_4} + \varepsilon_4\xi_2\eta_2 2|A_3||C_3|\cos\varphi_{A_3C_3} + \\ \xi_2^2|A_4|^2 + \zeta_2^2|B_4|^2 + \eta_2^2|C_4|^2 + \zeta_2\eta_2 2|B_4||C_4|\cos\varphi_{B_4C_4\gamma_4} + \\ \xi_2\zeta_2 2|A_4||B_4|\cos\varphi_{A_4B_4\gamma_4} + \gamma_4\xi_2\eta_2 2|A_4||C_4|\cos\varphi_{A_4C_4} \end{Bmatrix} \quad (19)$$

where coefficients $A_1$, $A_2$, $A_3$, and $A_4$ represent the amplitudes of the reference beams corresponding to the first, second, third, and fourth frequency components, respectively, of input beam 24; coefficients $B_1$, $B_2$, $B_3$, and $B_4$ represent the amplitudes of background beams corresponding to reference beams $A_1$, $A_2$, $A_3$, and $A_4$, respectively; coefficients $C_1$, $C_2$, $C_3$, and $C_4$ represent the amplitudes of the return measurement beams corresponding to reference beams $A_1$, $A_2$, $A_3$, and $A_4$, respectively; $P_1$ and $P_2$ represent the integrated intensities of the first frequency component in the first and second pulse sequences, respectively, of the input beam 24; and the values for $\epsilon_j$ and $\gamma_j$ are listed in Table 1. The description of the coefficients $\xi_j$, $\zeta_j$, and $\eta_j$ for the quad-homodyne detection method is the same as the corresponding portion of the description given for $\xi_j$, $\zeta_j$, and $\eta_j$ of the bi-homodyne detection method.

It is assumed in Equations (16), (17), (18), and (19) that the ratios of $|A_2|/|A_1|$ and $|A_4|/|A_3|$ are not dependent on j or the value of $P_j$. In order to simplify the representation of $S_j$ so as to project the important features without departing from either the scope or spirit of the present invention, it is also assumed in Equations (16), (17), (18), and (19) that the ratios of the amplitudes of the return measurement beams corresponding to $|A_{21}|/|A_1|$ and $|A_4|/|A_3|$ are not dependent on j or the value of $P_j$. However, the ratios $|C_2|/|C_1|$ and $|C_4|/|C_3|$ will be different from the ratios $|A_2|/|A_1|$ and $|A_4|/|A_3|$, respectively, when the ratio of the amplitudes of the measurement beam components corresponding to $|A_2|/|A_1|$ and $|A_4|/|A_3|$, respectively, are different from the ratios $|A_2|/|A_1|$ and $|A_4|/|A_3|$, respectively.

Noting that $\cos \phi_{A_2C_2} = +\sin \phi_{A_1C_1}$ by the control of the relative phase shifts between corresponding reference and measurement beam components in beam 32, Equations (16), (17), (18), and (19) may be written, respectively, as $$S_1 = P_1 \begin{Bmatrix} \xi_1^2(|A_1|^2 + |A_2|^2) + \zeta_1^2(|B_1|^2 + |B_2|^2) + \eta_1^2(|C_1|^2 + |C_2|^2) + \\ 2\zeta_1\eta_1[|B_1||C_1|\cos\varphi_{B_1C_1\varepsilon_1} + |B_2||C_2|\cos\varphi_{B_2C_2\gamma_1}] + \\ 2\xi_1\eta_1\left[\varepsilon_1|A_1||C_1|\cos\varphi_{A_1C_1} + \gamma_1\left(\frac{|A_2|}{|A_1|}\right)\left(\frac{|C_2|}{|C_1|}\right)|A_1||C_1|\sin\varphi_{A_1C_1}\right] + \\ 2\xi_1\zeta_1[|A_1||B_1|\cos\varphi_{A_1B_1\varepsilon_1} + |A_2||B_2|\cos\varphi_{A_2B_2\gamma_j}] \end{Bmatrix} \quad (20)$$

$$S_2 = P_1 \begin{Bmatrix} \xi_2^2(|A_3|^2 + |A_4|^2) + \zeta_2^2(|B_3|^2 + |B_4|^2) + \eta_2^2(|C_3|^2 + |C_4|^2) + \\ 2\zeta_2\eta_2[|B_3||C_3|\cos\varphi_{B_3C_3\varepsilon_2} + |B_4||C_4|\cos\varphi_{B_4C_4\gamma_2}] + \\ 2\xi_2\eta_2\left(\frac{|A_3|}{|A_1|}\right)\left(\frac{|C_3|}{|C_1|}\right)\begin{bmatrix}\varepsilon_2|A_1||C_1|\cos\varphi_{A_1C_1} \\ +\gamma_2\left(\frac{|A_4|}{|A_3|}\right)\left(\frac{|C_4|}{|C_3|}\right)|A_1||C_1|\sin\varphi_{A_1C_1}\end{bmatrix} + \\ 2\xi_2\zeta_2[|A_3||B_3|\cos\varphi_{A_3B_3\varepsilon_2} + |A_4||B_4|\cos\varphi_{A_4B_4\gamma_2}] \end{Bmatrix} \quad (21)$$

$$S_3 = P_2 \begin{Bmatrix} \xi_1^2(|A_1|^2 + |A_2|^2) + \zeta_1^2(|B_1|^2 + |B_2|^2) + \eta_1^2(|C_1|^2 + |C_2|^2) + \\ 2\zeta_1\eta_1[|B_1||C_1|\cos\varphi_{B_1C_1\varepsilon_3} + |B_2||C_2|\cos\varphi_{B_2C_2\gamma_3}] + \\ 2\xi_1\eta_1\left[\varepsilon_3|A_1||C_1|\cos\varphi_{A_1C_1} + \gamma_3\left(\frac{|A_2|}{|A_1|}\right)\left(\frac{|C_2|}{|C_1|}\right)|A_1||C_1|\sin\varphi_{A_1C_1}\right] + \\ 2\xi_1\zeta_1[|A_1||B_1|\cos\varphi_{A_1B_1\varepsilon_3} + |A_2||B_2|\cos\varphi_{A_2B_2\gamma_3}] \end{Bmatrix} \quad (22)$$

$$S_4 = P_2 \left\{ \begin{array}{l} \xi_2^2(|A_3|^2+|A_4|^2) + \zeta_2^2(|B_3|^2+|B_4|^2) + \eta_2^2(|C_3|^2+|C_4|^2) + \\ 2\zeta_2\eta_2[|B_3||C_3|\cos\varphi_{B_3C_3\varepsilon_4} + |B_4||C_4|\cos\varphi_{B_4C_4\gamma_4}] + \\ 2\xi_2\eta_2\left(\dfrac{|A_3|}{|A_1|}\right)\left(\dfrac{|C_3|}{|C_1|}\right)\left[\begin{array}{l}\varepsilon_4|A_1||C_1|\cos\varphi_{A_1C_1} \\ +\gamma_4\left(\dfrac{|A_4|}{|A_3|}\right)\left(\dfrac{|C_4|}{|C_3|}\right)|A_1||C_1|\sin\varphi_{A_1C_1}\end{array}\right] + \\ 2\xi_2\zeta_2[|A_3||B_3|\cos\varphi_{A_3B_3\varepsilon_4} + |A_4||B_4|\cos\varphi_{A_4B_4\gamma_4}] \end{array} \right\}, \quad (23)$$

where the relationship $\cos\phi_{A_2C_2} = \sin\phi_{A_1C_1}$ has been used without departing from either the scope or spirit of the present invention.

Information about the conjugated quadratures $|C_1|\cos\phi_{A_1C_1}$ and $|C_1|\sin\phi_{A_1C_1}$, are obtained using the symmetric and antisymmetric properties and orthogonality property of the conjugated quadratures as represented by the following digital filters applied to the signal values $S_j$ for $j=1,2,3,4$:

$$F_3(S) = \left(\dfrac{1}{P_1'}\right)\left(\dfrac{S_1}{\xi_1'^2} - \dfrac{S_2}{\xi_2'^2}\right) - \left(\dfrac{1}{P_2'}\right)\left(\dfrac{S_3}{\xi_1'^2} - \dfrac{S_4}{\xi_2'^2}\right), \quad (24)$$

$$F_4(S) = \left(\dfrac{1}{P_1'}\right)\left(\dfrac{S_1}{\xi_1'^2} - \dfrac{S_2}{\xi_2'^2}\right) + \left(\dfrac{1}{P_2'}\right)\left(\dfrac{S_3}{\xi_1'^2} - \dfrac{S_4}{\xi_2'^2}\right), \quad (25)$$

The description of $\xi_j'$ and $P_j'$ for the quad-homodyne detection method is the same as the corresponding description given for $\xi_j'$ and $P_j'$ in the bi-homodyne detection method. Using Equations (20), (21), (22), (23), (24), and (25), the following expressions are obtained for the components of the conjugated quadratures $|C_1|\cos\phi_{A_1C_1}$ and $|C_1|\sin\phi_{A_1C_1}$ respectively:

$$\begin{aligned} F_3(S) = &\left(\dfrac{P_1}{P_1'} - \dfrac{P_2}{P_2'}\right)\left[(|A_1|^2+|A_2|^2)\left(\dfrac{\xi_1^2}{\xi_1'^2}\right) - (|A_3|^2+|A_4|^2)\left(\dfrac{\xi_2^2}{\xi_2'^2}\right)\right] + \\ &\left(\dfrac{P_1}{P_1'} - \dfrac{P_2}{P_2'}\right)\left[(|B_1|^2+|B_2|^2)\left(\dfrac{\zeta_1^2}{\xi_1'^2}\right) - (|B_3|^2+|B_4|^2)\left(\dfrac{\zeta_2^2}{\xi_2'^2}\right)\right] + \\ &\left(\dfrac{P_1}{P_1'} - \dfrac{P_2}{P_2'}\right)\left[(|C_1|^2+|C_2|^2)\left(\dfrac{\eta_1^2}{\xi_1'^2}\right) - (|C_3|^2+|C_4|^2)\left(\dfrac{\eta_2^2}{\xi_2'^2}\right)\right] + \\ &2\left(\dfrac{P_1}{P_1'} - \dfrac{P_2}{P_2'}\right)\left[\left(\dfrac{\xi_1\eta_1}{\xi_1'^2}\right) + \left(\dfrac{\xi_2\eta_2}{\xi_2'^2}\right)\left(\dfrac{|A_3|}{|A_1|}\right)\left(\dfrac{|C_3|}{|C_1|}\right)\right]|A_1||C_1|\cos\varphi_{A_1C_1} + \\ &2\left(\dfrac{P_1}{P_1'} - \dfrac{P_2}{P_2'}\right)\left(\dfrac{|A_2|}{|A_1|}\right)\left(\dfrac{|C_2|}{|C_1|}\right)\left[\begin{array}{l}\left(\dfrac{\xi_1\eta_1}{\xi_1'^2}\right) \\ +\left(\dfrac{\xi_2\eta_2}{\xi_2'^2}\right)\left(\dfrac{|A_4|}{|A_2|}\right)\left(\dfrac{|C_4|}{|C_2|}\right)\end{array}\right]|A_1||C_1|\sin\varphi_{A_1C_1} + \\ &2\left(\dfrac{P_1}{P_1'}\cos\varphi_{A_1B_1\varepsilon_1} - \dfrac{P_2}{P_2'}\cos\varphi_{A_1B_1\varepsilon_3}\right)\dfrac{\xi_1\zeta_1}{\xi_1'^2}|A_1||B_1| - \\ &2\left(\dfrac{P_1}{P_1'}\cos\varphi_{A_3B_3\varepsilon_2} - \dfrac{P_2}{P_2'}\cos\varphi_{A_3B_3\varepsilon_4}\right)\dfrac{\xi_2\zeta_2}{\xi_2'^2}|A_3||B_3| + \\ &2\left(\dfrac{P_1}{P_1'}\cos\varphi_{A_2B_2\gamma_1} - \dfrac{P_2}{P_2'}\cos\varphi_{A_2B_2\gamma_3}\right)\dfrac{\xi_1\zeta_1}{\xi_1'^2}|A_2||B_2| - \\ &2\left(\dfrac{P_1}{P_1'}\cos\varphi_{A_4B_4\gamma_2} - \dfrac{P_2}{P_2'}\cos\varphi_{A_4B_4\gamma_4}\right)\dfrac{\xi_2\zeta_2}{\xi_2'^2}|A_4||B_4| + \\ &2\left(\dfrac{P_1}{P_1'}\cos\varphi_{B_1C_1\varepsilon_1} - \dfrac{P_2}{P_2'}\cos\varphi_{B_1C_1\varepsilon_3}\right)\dfrac{\xi_1\zeta_1}{\xi_1'^2}|B_1||C_1| - \\ &2\left(\dfrac{P_1}{P_1'}\cos\varphi_{B_3C_3\varepsilon_2} - \dfrac{P_2}{P_2'}\cos\varphi_{B_3C_3\varepsilon_4}\right)\dfrac{\xi_2\zeta_2}{\xi_2'^2}|B_3||C_3| + \\ &2\left(\dfrac{P_1}{P_1'}\cos\varphi_{B_2C_2\gamma_1} - \dfrac{P_2}{P_2'}\cos\varphi_{B_2C_2\gamma_3}\right)\dfrac{\xi_1\zeta_1}{\xi_1'^2}|B_2||C_2| - \\ &2\left(\dfrac{P_1}{P_1'}\cos\varphi_{B_4C_4\gamma_2} - \dfrac{P_2}{P_2'}\cos\varphi_{B_4C_4\gamma_4}\right)\dfrac{\xi_2\zeta_2}{\xi_2'^2}|B_4||C_4|, \end{aligned} \quad (26)$$

-continued $$F_4(S) = \left(\frac{P_1}{P_1'} + \frac{P_2}{P_2'}\right)\left[(|A_1|^2 + |A_2|^2)\left(\frac{\xi_1^2}{\xi_1'^2}\right) - (|A_3|^2 + |A_4|^2)\left(\frac{\xi_2^2}{\xi_2'^2}\right)\right] +$$

$$\left(\frac{P_1}{P_1'} - \frac{P_2}{P_2'}\right)\left[(|B_1|^2 + |B_2|^2)\left(\frac{\xi_1^2}{\xi_1'^2}\right) - (|B_3|^2 + |B_4|^2)\left(\frac{\xi_2^2}{\xi_2'^2}\right)\right] +$$

$$\left(\frac{P_1}{P_1'} + \frac{P_2}{P_2'}\right)\left[(|C_1|^2 + |C_2|^2)\left(\frac{\eta_1^2}{\xi_1'^2}\right) - (|C_3|^2 + |C_4|^2)\left(\frac{\eta_2^2}{\xi_2'^2}\right)\right] +$$

$$2\left(\frac{P_1}{P_1'} - \frac{P_2}{P_2'}\right)\left[\left(\frac{\xi_1\eta_1}{\xi_1'^2}\right) + \left(\frac{\xi_2\eta_2}{\xi_2'^2}\right)\left(\frac{|A_3|}{|A_1|}\right)\left(\frac{|C_3|}{|C_1|}\right)\right]|A_1||C_1|\cos\varphi_{A_1C_1} +$$

$$2\left(\frac{P_1}{P_1'} + \frac{P_2}{P_2'}\right)\left(\frac{|A_2|}{|A_1|}\right)\left(\frac{|C_2|}{|C_1|}\right)\left[\begin{array}{c}\left(\frac{\xi_1\eta_1}{\xi_1'^2}\right) \\ +\left(\frac{\xi_2\eta_2}{\xi_2'^2}\right)\left(\frac{|A_4|}{|A_2|}\right)\left(\frac{|C_4|}{|C_2|}\right)\end{array}\right]|A_1||C_1|\sin\varphi_{A_1C_1} +$$

$$2\left(\frac{P_1}{P_1'}\cos\varphi_{A_1B_1\varepsilon_1} + \frac{P_2}{P_2'}\cos\varphi_{A_1B_1\varepsilon_3}\right)\frac{\xi_1\zeta_1}{\xi_1'^2}|A_1||B_1| -$$

$$2\left(\frac{P_1}{P_1'}\cos\varphi_{A_3B_3\varepsilon_2} + \frac{P_2}{P_2'}\cos\varphi_{A_3B_3\varepsilon_4}\right)\frac{\xi_2\zeta_2}{\xi_2'^2}|A_3||B_3| +$$

$$2\left(\frac{P_1}{P_1'}\cos\varphi_{A_2B_2\gamma_1} + \frac{P_2}{P_2'}\cos\varphi_{A_2B_2\gamma_3}\right)\frac{\xi_1\zeta_1}{\xi_1'^2}|A_2||B_2| -$$

$$2\left(\frac{P_1}{P_1'}\cos\varphi_{A_4B_4\gamma_2} + \frac{P_2}{P_2'}\cos\varphi_{A_4B_4\gamma_4}\right)\frac{\xi_2\zeta_2}{\xi_2'^2}|A_4||B_4| +$$

$$2\left(\frac{P_1}{P_1'}\cos\varphi_{B_1C_1\varepsilon_1} + \frac{P_2}{P_2'}\cos\varphi_{B_1C_1\varepsilon_3}\right)\frac{\xi_1\zeta_1}{\xi_1'^2}|B_1||C_1| -$$

$$2\left(\frac{P_1}{P_1'}\cos\varphi_{B_3C_3\varepsilon_2} + \frac{P_2}{P_2'}\cos\varphi_{B_3C_3\varepsilon_4}\right)\frac{\xi_2\zeta_2}{\xi_2'^2}|B_3||C_3| +$$

$$2\left(\frac{P_1}{P_1'}\cos\varphi_{B_2C_2\gamma_1} + \frac{P_2}{P_2'}\cos\varphi_{B_2C_2\gamma_3}\right)\frac{\xi_1\zeta_1}{\xi_1'^2}|B_2||C_2| -$$

$$2\left(\frac{P_1}{P_1'}\cos\varphi_{B_4C_4\gamma_2} + \frac{P_2}{P_2'}\cos\varphi_{B_4C_4\gamma_4}\right)\frac{\xi_2\zeta_2}{\xi_2'^2}|B_4||C_4|.$$

(27)

The parameters $$\left[\left(\frac{|A_2|}{|A_1|}\right)\left(\frac{|C_2|}{|C_1|}\right)\right], \quad (28)$$

$$\left(\frac{|A_4|}{|A_2|}\right)\left(\frac{|C_4|}{|C_2|}\right), \quad (29)$$

$$\left[\left(\frac{|A_3|}{|A_1|}\right)\left(\frac{|C_3|}{|C_1|}\right)\right] \quad (30)$$

need to be determined in order to complete the determination of a conjugated quadratures for certain end use applications. The parameters given by Equations (28), (29), and (30) can for example be measured by procedures analogous to the procedure described for the bi-homodyne detection method with respect to measuring the quantity specified by Equation (11).

The remaining description of the second variant of the third embodiment is the same as the corresponding portion of the description given for the third embodiment.

Figure 3A:
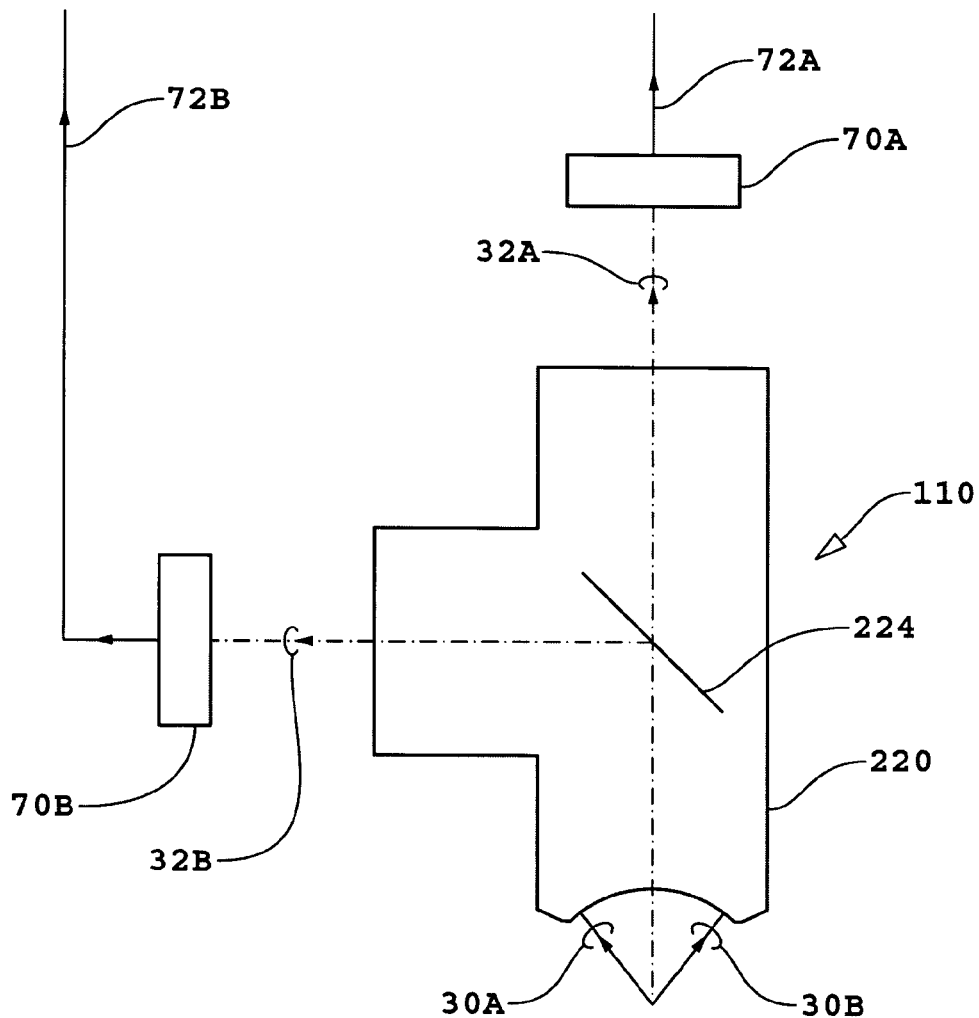
FIG. 3a is a schematic diagram of a fourth embodiment which employs a low power microscope and a dichroic beam-splitter.

A fourth embodiment obtains non-joint measurements of conjugated quadratures of fields of measurement beams reflected/scattered by a substrate 60 using the quad-homodyne detection method. The fourth embodiment comprises the interferometric confocal microscopy system of the first embodiment of the present except for microscope 110 of the first embodiment that is replaced by microscope 220 as shown in FIG. 3a. Also the fourth embodiment comprises two detectors 70A and 70B. Microscope 220 comprises a low power microscope and a dichroic beam-splitter 224 that generates two output beams 32A and 32B. The difference in frequencies of components of output beam components 30A and 30B corresponding to the amplitudes $A_1$ and $B_1$ is chosen in conjunction with the design of dichroic beam-splitter 224 such that the $A_1$ components are directed to detector 70A and the $B_1$ components are directed to detector 70B. The sets of four arrays of electrical interference values are obtained in two read out cycles instead of four read out cycles such as for the first embodiment described herein.

The difference in frequencies of output beam components 30A and 30B corresponding to the amplitudes $A_1$ and $B_1$ may be much less than the frequencies of output beam components 30A and 30B corresponding to the amplitudes $A_1$ and $B_1$ or may be of some intermediate value or of the order of the frequency of the respective beams. The difference in frequencies of components of beam components 30A and 30B corresponding to amplitude $A_1$ and the difference in frequencies of components of beam components 30A and 30B corresponding to amplitude $B_1$ are much less than the frequencies of corresponding beams. Beam 24 comprises four frequency components for the fourth embodiment. In the fourth embodiment, the two frequency components of beam components 30A and 30B corresponding to the amplitude of one component of a conjugate quadratures are directed to a single pixel and the two frequency components of beam components 30A and 30B corresponding to the amplitude of the second component of the conjugated quadratures are directed to a single pixel.

The description of the processing of measured electrical interference signals by electronic processor and controller 80 for determination of conjugated quadratures is the same as the portion of the corresponding description given for the third embodiment described herein.

The source 18 for the fourth embodiment may generate two frequency components of beam 20. If the frequencies of the two frequency components of beam 24 are larger than can be produced by acousto-optic modulators or by different longitudinal modes of a laser, then source 18 comprises two different single frequency laser sources. If the difference in frequencies of the two frequency components of beam 20 are not too large, the frequency shifting introduced by two-frequency generator and frequency-shifter 22 may comprise acousto-optic modulators. If larger frequency shifts are required, then source 18 may comprise for example four single frequency lasers. The relative frequencies of the two or four lasers comprising source 18 are stabilized to the accuracy required to maintain the desired phase shifts introduced between the reference and return measurement beams.

The temporal window functions of frequency components of beam 24 corresponding to one conjugated quadratures of a first field may be different from the temporal window functions of the other frequency components of beam 24 corresponding to a second conjugated quadratures of a second field. This difference in time between the temporal window functions may be varied and certain properties of the substrate studied. One property is the affect of the change in conductivity of the substrate produced by a first pulse and a second pulse used as a probe. Another affect is the generation of an acoustic pulse by the first pulse of beam 24 and the second pulse of beam 24 used to detect the properties of the acoustic pulse.

Figure 3B:
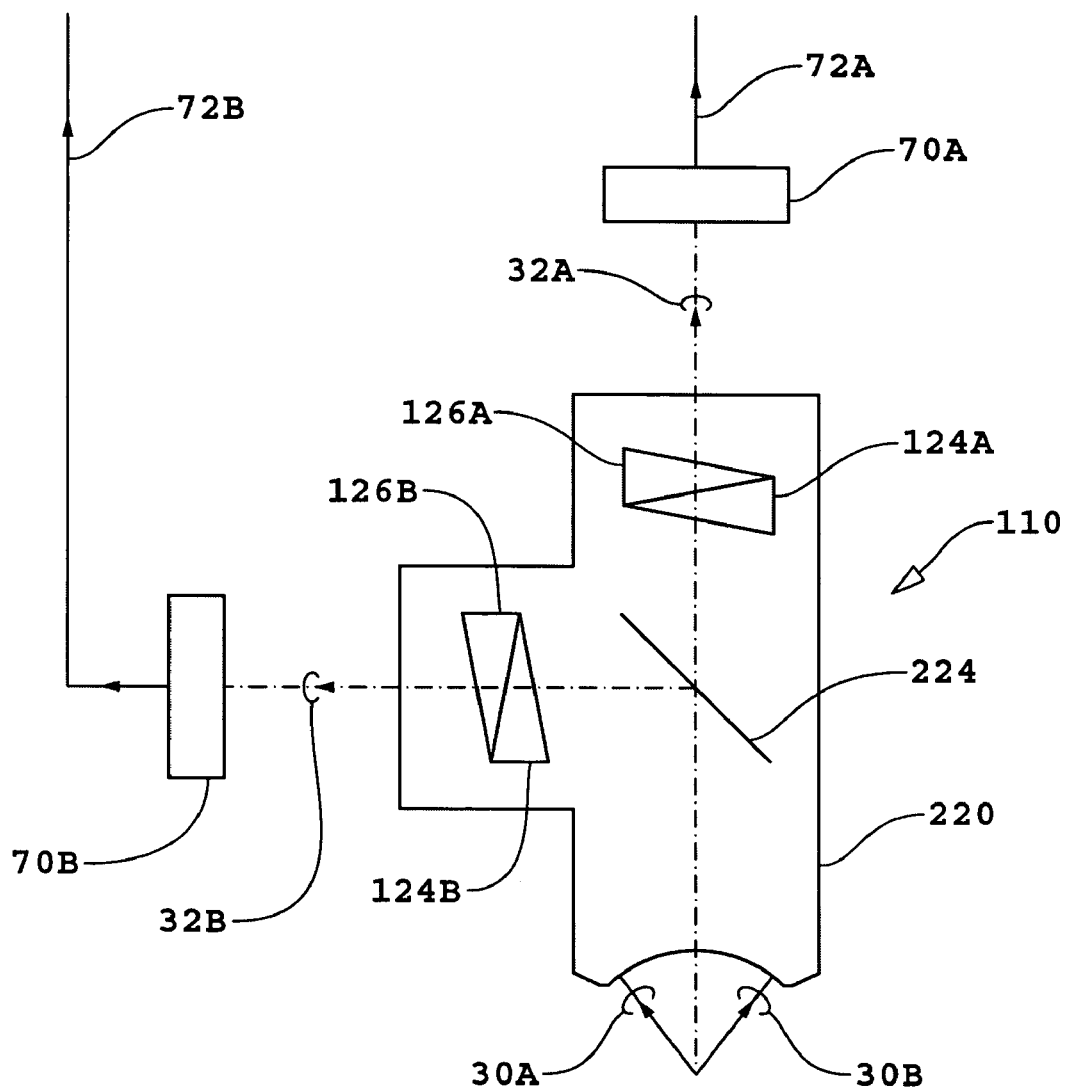
FIG. 3b is a schematic diagram of a variant of the fourth embodiment which employs a low power microscope and dispersive elements.

A variant of the fourth embodiment obtains measurements of conjugated quadratures of fields of measurement beams reflected/scattered by a substrate 60 using the double homodyne detection method. The variant of the fourth embodiment comprises the interferometric confocal microscopy system of the fourth embodiment except for microscope 220 of the fourth embodiment that is replaced by microscope 220A as shown in FIG. 3b. Microscope 220A comprises a low power microscope and dispersive elements comprising prisms 124A and 126A and prisms 124B and 126B. Prisms 124A and 126A and prisms 124B and 126B form direct vision prisms. Other forms of a dispersive element may be used such as a grating without departing from the scope or spirit of the present invention. The difference in frequencies of components of output beams 32A and 32B corresponding to amplitudes $A_1$ and $B_1$, respectively, are chosen in conjunction with the design of the dispersion of the direct vision prisms such that the $A_1$ components of output beam 32A are directed to two different sets of pixels of detector 70A and that the $B_1$ components of output beam 32B are directed to two different sets of pixels of detector 70B. Beam 24 comprises four frequency components. A set of four arrays of electrical interference values are obtained in a single read out cycle instead of four read out cycles such as for the first embodiment described herein.

Four arrays of electrical interference signal values are obtained simultaneously and processed for amplitudes of conjugated quadratures using the procedure described herein for the single-homodyne detection method.

In certain end use applications, only one component of the conjugated quadratures of fields may need to be measured such as described in commonly owned U.S. Provisional Application No. 60/448,360 (ZI-41) entitled "Longitudinal Differential Interferometric Confocal Microscopy for Surface Profiling."

In at least some embodiments, pinhole array beam-splitter 12 may be scanned in a direction opposite to the direction of scan of substrate 60 and with a speed such that the conjugate images of the pinholes of pinhole array beam-splitter 12 stay superimposed with spots on or in substrate 60 that are being imaged. This scanning mode of operation is analogous to the relative motions of reticle stage and a wafer stage of a lithography tool operating in a scanning mode. The issue of traditional critical alignment of conjugate confocal pinholes in a confocal microscopy system is nonexistent, i.e. the registration of the pinholes generating the array of reference beams and the pinholes generating the array of measurement beams is automatic.

In each of the embodiments described herein, a resonant build-up cavity may be incorporated in the respective interferometric confocal microscopy systems such that input beam 24 is incident on the resonant build up cavity (not shown in a figure) such as described in commonly owned U.S. patent application Ser. No. 09/917,400 filed Jul. 27, 2001 (ZI-18) and entitled "Multiple-Source Arrays with Optical Transmission Enhanced by Resonant Cavities" by Henry A. Hill, the contents of which are incorporated herein in their entirety by reference. The resonant cavity is located after mirror 54 (see FIG. 2). In the case of the resonant cavity, one mirror of the resonant cavity comprises the pinhole array beam-splitter 12. The frequencies of the longitudinal modes of the resonant cavity are designed to include at least the set of four frequencies that comprise input beam 24. The use of the resonant build up cavity increases the efficiency of coupling input beam 24 to the pinholes of pinhole array beam-splitter 12 with a concomitant increase in generated reference and return measurement beam components of output beam components 30A and 30B.

Also in each of the embodiments described herein, pinhole array beam-splitter 12 may be replaced with a guided wave source such as described in U.S. Provisional Application No. 60/445,739 filed Feb. 7, 2003 (ZI-39) and entitled "Multiple-Source Arrays Fed By Guided Wave Structures And Resonant Guided-Wave Structure Cavities" by Henry A. Hill, the contents of which are herein incorporated in their entirety by reference. The quided wave source comprises a slab waveguide and in one surface of a slab waveguide, there is an array of pinholes corresponding to the pinhole array of beam-splitter 12. Thus the slab waveguide of the guided wave source serves as a pinhole array beam-splitter the same as pinhole array of beam-splitter 12 does for each of the embodiments descried herein.

The advantage of the use of the use of the guided wave source is an increase in efficiency of coupling of input beam 24 to the pinhole array beam-splitter as compared to that of obtained when not using the guided wave source or using the resonant build-up cavity to increase coupling efficiency.

In certain end use applications, the interior of substrate 60 is imaged. In this case, there will be aberrations introduced. In another embodiment, compensation for aberrations is accomplished by introducing a thin layer (the thin layer has an index of refraction different from lens 50) between lens 50 and pinhole array beam-splitter 12 such as described in commonly owned U.S. Provisional Application No. 60/444, 707 filed Feb. 4, 2003 (ZI-44) and entitled "Compensation of Effects of Mismatch in Indices of Refraction of a Substrate and Interface Medium in Confocal and Interferometric Confocal Microscopy" by Henry A. Hill, the contents of which are incorporated herein in there entirety by reference.

What is claimed is:

1. A confocal interferometry system for making interferometric measurements of an object, the system comprising:
   an array of pinholes positioned to receive a source beam and, for each pinhole in the array of pinholes, separate the source beam into a corresponding reference beam on one side of the array of pinholes and a corresponding measurement beam on the other side of the array of pinholes;
   a first imaging system arranged to image the array of pinholes onto an array of spots on or in the object so that the corresponding measurement beam for each pinhole of the array of pinholes is directed to a corresponding different spot of the array of spots and produces for that spot a corresponding return measurement beam, said first imaging system also arranged to image the array of spots onto the array of pinholes so that the corresponding return measurement beam from each spot of the array of spots is directed back to a corresponding different pinhole in the array of pinholes, wherein for each pinhole the pinhole array combines the return measurement and reference beams for that pinhole to produce a corresponding combined beam; and
   a detector assembly including an array of detector elements aligned with the array of pinholes so that the corresponding combined beam for each pinhole is directed to a different corresponding detector element of the array of detector elements.

2. The confocal interferometry system of claim 1 further comprising a second imaging system that images the array of pinholes onto the array of detector elements.

3. The confocal interferometry system of claim 1 wherein the first imaging system comprises:
   a beam splitter positioned to receive, for each pinhole, the corresponding measurement beam and separate that corresponding measurement beam into a transmitted portion and a reflected portion; and
   a reflecting surface positioned to image each pinhole of the pinhole array onto a corresponding spot on or in the object via the beam splitter and thereby direct the measurement beam from that pinhole onto said corresponding spot.

4. The confocal interferometry system of claim 3 wherein the reflecting surface is substantially concentric with a point on the object.

5. The confocal interferometry system of claim 4, wherein the first imaging system further comprises a refracting surface positioned between the object and the beam splitter to receive light rays from the object.

6. The confocal interferometry system of claim 5, wherein the reflecting surface substantially conforms to a sphere having a first radius and the refracting surface conforms to a sphere having a second radius, wherein the first radius is greater than the second radius.

7. The confocal interferometry system of claim 6, wherein the reflecting surface and the refracting surface have the same center of curvature.

8. The confocal interferometry system of claim 4, wherein the first imaging system further comprises a refracting surface positioned between the beam splitter and the pinhole array to receive light rays focused by the reflecting surface.

9. The confocal interferometry system of claim 3 wherein the reflecting surface is substantially concentric with an image point on the pinhole array.

10. The confocal interferometry system of claim 9, wherein the first imaging system further comprises a refracting surface positioned between the pinhole array and the beam splitter to receive light rays from the pinhole array.

11. The confocal interferometry system of claim 10, wherein the reflecting surface substantially conforms to a sphere having a first radius and the refracting surface conforms to a sphere having a second radius, wherein the first radius is greater than the second radius.

12. The confocal interferometry system of claim 11, wherein the reflecting surface and the refracting surface have the same center of curvature.

13. The confocal interferometry system of claim 3 wherein the first imaging system further comprises a second reflecting surface on the other side of the beam splitter from the first-mentioned reflecting surface and positioned to image each pinhole of the pinhole array onto its corresponding spot on or in the object via the beam splitter.

14. The confocal interferometry system of claim 13 wherein the first-mentioned reflecting surface is substantially concentric with a point on the object and the second reflecting surface is substantially concentric with the image point on the pinhole array.

15. The confocal interferometry system of claim 14, wherein the first imaging system further comprises a first refracting surface positioned between the object and the beam splitter to receive light rays from the object and a second refracting surface positioned between the beam splitter and the pinhole array to receive light rays focused by the reflecting surface.

16. The confocal interferometry system of claim 15, wherein the first-mentioned reflecting surface substantially conforms to a sphere having a first radius and the first refracting surface conforms to a sphere having a second radius, wherein the first radius is greater than the second radius.

17. The confocal interferometry system of claim 16, wherein the first-mentioned reflecting surface and the first refracting surface have the same center of curvature.

18. The confocal interferometry system of claim 15, wherein the second reflecting surface substantially conforms to a sphere having a first radius and the second refracting surface conforms to a sphere having a second radius, wherein the first radius is greater than the second radius.

19. The confocal interferometry system of claim 18, wherein the second reflecting surface and the second refracting surface have the same center of curvature.

20. The confocal interferometry system of claim 19, wherein the first-mentioned reflecting surface and the second reflecting surface have the same radius of curvature.

21. The confocal interferometry system of claim 20, wherein the first-mentioned reflecting surface and the second reflecting surface have respective centers of curvature that are conjugate points with respect to the beam splitter.

22. The confocal interferometry system of claim 20, wherein the pinhole array is a two-dimensional array.

23. The confocal interferometry system of claim 22, wherein the two-dimensional array is of equally-spaced holes.

24. The confocal interferometry system of claim 23, wherein the equally-spaced holes are circular apertures.

25. A confocal interferometry system for making interferometric measurements of an object, the system comprising:
   an array of pinholes positioned to receive a source beam and, for any selected pinhole in the array of pinholes, separate the source beam into a corresponding reference beam on one side of the array of pinholes and a corresponding measurement beam on the other side of the array of pinholes;

a first imaging system arranged to image the array of pinholes onto an array of spots on or in the object so that the corresponding measurement beam for said any selected pinhole is directed to a corresponding spot of the array of spots and produces for that spot a corresponding return measurement beam, said first imaging system also arranged to image the array of spots onto the array of pinholes so that the corresponding return measurement beam from said given spot is directed back to said any selected pinhole, wherein the pinhole array combines the corresponding reference and return measurement beams to produce a corresponding combined beam; and a detector assembly including an array of detector elements aligned with the array of pinholes so that the corresponding combined beam for each pinhole is directed to different corresponding detector element of the array of detector elements.

26. The confocal interferometry system of claim 25 further comprising a second imaging system that images the array of pinholes onto the array of detector elements.

27. The confocal interferometry system of claim 25 wherein the first imaging system is a catadioptric imaging system.

28. A confocal interferometry system for making interferometric measurements of an object, the system comprising:

a mask defining a pinhole positioned to receive a source beam and separate the source beam into a reference beam on one side of the pinhole and a measurement beam on the other side of the pinhole;

a first imaging system arranged to image the pinhole onto a spot on or in the object so that the measurement beam is directed to said spot and produces for said spot a return measurement beam, said first imaging system also arranged to image said spot onto the pinhole so that the return measurement beam from said spot is directed back to said pinhole, wherein the pinhole combines the return measurement and reference beams to produce a combined beam; and a detector system including a detector element that receives the combined beam.

29. The confocal interferometry system of claim 28 further comprising a second imaging system that images the pinhole onto the detector element so that the combined beam is directed to the detector element.

30. The confocal interferometry system of claim 28 wherein the first imaging system is a catadioptric imaging system.

* * * * *